US012562112B2

(12) United States Patent
No et al.

(10) Patent No.: US 12,562,112 B2
(45) Date of Patent: Feb. 24, 2026

(54) DISPLAY DEVICE DETECTING ILLUMINANCE FOR EACH PANEL POSITION

(71) Applicant: Samsung Display Co., LTD., Yongin-si (KR)

(72) Inventors: Sang Yong No, Yongin-si (KR); Dong Hee Shin, Yongin-si (KR); Sunkwun Son, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/621,351

(22) Filed: Mar. 29, 2024

(65) Prior Publication Data

US 2024/0420634 A1 Dec. 19, 2024

(30) Foreign Application Priority Data

Jun. 13, 2023 (KR) ........................ 10-2023-0075786

(51) Int. Cl.
*G09G 3/32* (2016.01)
*G09G 3/3233* (2016.01)
*G09G 3/3275* (2016.01)

(52) U.S. Cl.
CPC ......... *G09G 3/3233* (2013.01); *G09G 3/3275* (2013.01); *G09G 2310/061* (2013.01); *G09G 2330/021* (2013.01); *G09G 2360/144* (2013.01)

(58) Field of Classification Search
CPC .............................................. G09G 3/30–3291
See application file for complete search history.

(56) References Cited

U.S. PATENT DOCUMENTS

| | | | | |
|---|---|---|---|---|
| 11,543,904 | B2 | 1/2023 | Bok et al. | |
| 2016/0117999 | A1* | 4/2016 | Hayashi | G09G 3/3648 345/99 |
| 2022/0336561 | A1* | 10/2022 | Cha | G06V 40/1318 |
| 2023/0016151 | A1 | 1/2023 | Ko et al. | |

FOREIGN PATENT DOCUMENTS

| | | | |
|---|---|---|---|
| KR | 1020210086907 | A | 7/2021 |
| KR | 1020230009636 | A | 1/2023 |

* cited by examiner

*Primary Examiner* — Roy P Rabindranath
(74) *Attorney, Agent, or Firm* — CANTOR COLBURN LLP

(57) ABSTRACT

A display device includes a pixel, a sensor including a sensor driving circuit and a sensing element, and a display panel in which a display area is defined. The display area includes a first area and a second area, the sensor driving circuit is connected to the sensing element and includes a reset transistor including a gate electrode that receives a reset control signal, the reset control signal includes a first reset control signal and a second reset control signal different from the first reset control signal, and the first reset control signal is provided to the reset transistor disposed in the first area, and the second reset control signal is provided to the reset transistor disposed in the second area.

20 Claims, 10 Drawing Sheets

DISPLAY DEVICE DETECTING ILLUMINANCE FOR EACH PANEL POSITION

This application claims priority to Korean Patent Application No. 10-2023-0075786, filed on Jun. 13, 2023, and all the benefits accruing therefrom under 35 U.S.C. § 119, the content of which in its entirety is herein incorporated by reference.

BACKGROUND

1. Field

Embodiments of the disclosure described herein relate to a display device and more particularly, relate to a display device capable of detecting illuminance for each panel position.

2. Description of the Related Art

A display device displays an image to provide information to a user or provides various functions that enable organic communication with the user, such as a function of sensing an input of the user. Recent display devices also include a function for detecting information (e.g., biometric information) provided by a user. Further, the recent display devices include a function for detecting ambient brightness. That is, the display device includes a sensor for detecting a fingerprint and/or illuminance methods for recognizing user information include a capacitive method for detecting a change in capacitance generated between electrodes, an optical method for detecting incident light using an optical sensor, and an ultrasonic method for detecting vibration using piezoelectric materials or the like.

SUMMARY

Embodiments of the disclosure provide a display device capable of detecting illuminance for each panel position.

In an embodiment of the disclosure, a display device includes a pixel including a pixel driving circuit and a light-emitting element, a sensor including a sensor driving circuit and a sensing element, and a display panel having a display area defined therein, where the display area includes a first area and a second area adjacent to the first area, the sensor driving circuit is electrically connected to the sensing element and includes a reset transistor including a gate electrode that receives a reset control signal, the reset control signal includes a first reset control signal and a second reset control signal different from the first reset control signal, and the first reset control signal is provided to the reset transistor disposed in the first area, and the second reset control signal is provided to the reset transistor disposed in the second area.

In an embodiment, the sensor may be provided in plural, and a plurality of sensors may include a first sensor disposed in the first area and a second sensor disposed in the second area.

In an embodiment, the first sensor may sense a fingerprint and the second sensor may sense an illuminance.

In an embodiment, the second area may include a first sensing area and a second sensing area spaced apart from the first sensing area in a predetermined direction, and a falling time point of the second reset control signal provided to the first sensing area may be different from a falling time point of the second reset control signal provided to the second sensing area.

In an embodiment, the second reset control signal provided to the second sensing area may be delayed by a first interval from the second reset control signal provided to the first sensing area.

In an embodiment, the second area may further include a third sensing area spaced apart from the first sensing area in the predetermined direction with the second sensing area interposed therebetween. The second reset control signal provided to the third sensing area may be delayed by a second interval from the second reset control signal provided to the first sensing area. The second interval may be longer than the first interval.

In an embodiment, the reset transistor may further include a first electrode receiving a reset voltage and a second electrode connected to a first sensing node. The sensor driving circuit of the second sensor may further include an amplification transistor including a first electrode receiving a sensing driving voltage, a second electrode connected to a second sensing node, and a gate electrode connected to the first sensing node, and an output transistor including a first electrode connected to the second sensing node, a second electrode connected to a readout line, and a gate electrode receiving an output control signal.

In an embodiment, the output control signal may be provided during an output interval. A first reset interval in which the second reset control signal provided to the first sensing area is provided may not overlap the output interval, and a second reset interval in which the second reset control signal provided to the second sensing area is provided may overlaps the output interval.

In an embodiment, the output interval may include a first output interval and a second output interval which are consecutive. The second sensor may output a signal corresponding to a first illuminance of the first sensing area during the first output interval, and output a signal corresponding to a second illuminance of the second sensing area during the second output interval.

In an embodiment, the display device may further include a driving circuit that drives the display panel, and the driving circuit may detect an external brightness based on one of the first illuminance and the second illuminance.

In an embodiment, the display panel may further include a plurality of data lines electrically connected to the pixel. The driving circuit may include a data driver that outputs a data signal to the plurality of data lines. The data driver may operate in a blank interval in which the data signal is not output to the plurality of data lines and an active interval in which the data signal is output to the plurality of data lines.

In an embodiment, the first reset interval may overlap the blank interval, and the second reset interval may overlap the active interval.

In an embodiment, a pulse width of the second reset control signal may be narrower than a pulse width of the first reset control signal.

In an embodiment, a display device includes a pixel including a pixel driving circuit and a light-emitting element, a sensor including a sensor driving circuit and a sensing element, and a display panel in which a display area is defined, where the display area includes a first area and a second area adjacent to the first area, the second area includes a first sensing area and a second sensing area spaced apart from the first sensing area in a predetermined direction, the sensor driving circuit is electrically connected to the sensing element and includes a reset transistor including a gate electrode that receives a reset control signal, and a falling time point of the reset control signal provided to the first sensing area is different from a falling time point of the reset control signal provided to the second sensing area.

In an embodiment, the sensor may include a plurality of sensors, and the plurality of sensors may include a first sensor disposed in the first area and a second sensor disposed in the second area. The first sensor may sense a fingerprint and the second sensor may sense an illuminance.

In an embodiment, the first sensor may receive light during a first light reception interval, and the second sensor may receive light during a second light reception interval shorter than the first light reception interval.

In an embodiment, the reset control signal provided to the second sensing area may be delayed by a first interval from the reset control signal provided to the first sensing area.

In an embodiment, the second area may further include a third sensing area spaced apart from the first sensing area in the predetermined direction with the second sensing area interposed therebetween. The reset control signal provided to the third sensing area may be delayed by a second interval from the reset control signal provided to the first sensing area. The second interval may be longer than the first interval.

In an embodiment, the reset transistor may further include a first electrode receiving a reset voltage and a second electrode connected to a first sensing node. The sensor driving circuit may include an amplification transistor including a first electrode receiving a sensing driving voltage, a second electrode connected to a second sensing node, and a gate electrode connected to the first sensing node, and an output transistor including a first electrode connected to the second sensing node, a second electrode connected to a readout line, and a gate electrode receiving an output control signal.

In an embodiment, the output control signal may be provided during an output interval. The reset control signal provided to the first sensing area may not overlap the output interval, and the reset control signal provided to the second sensing area may overlap the output interval.

BRIEF DESCRIPTION OF THE DRAWINGS

The above and other embodiments, advantages and features of the disclosure will become apparent by describing in detail embodiments thereof with reference to the accompanying drawings.

DETAILED DESCRIPTION

Figure 1:
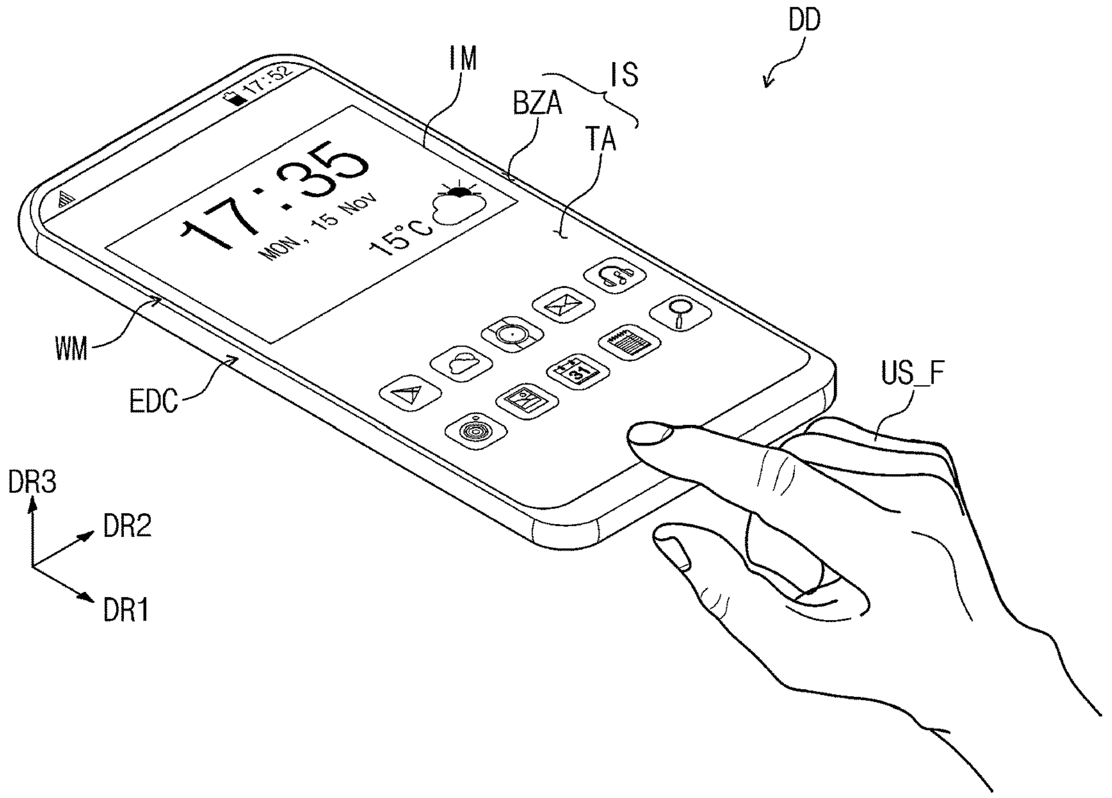
FIG. 1 is a perspective view illustrating an embodiment of a display device according to the disclosure.

In the specification, the expression that a first component (or area, layer, part, portion, etc.) is "on", "connected to", or "coupled to" a second component means that the first component is directly on, connected to, or coupled to the second component or means that a third component is disposed therebetween.

The same reference numerals refer to the same components. Also, in drawings, the thickness, ratio, and dimension of components are exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are used only to differentiate one component from another component. For example, without departing the scope of the disclosure, a first component may be referred to as a second component, and similarly, a second component may be referred to as a first component. As used herein, singular forms may include plural forms as well unless the context clearly indicates otherwise.

Also, the terms "under", "below", "on", "above", etc. are used to describe the correlation of components illustrated in drawings. The terms that are relative in concept are described based on a direction shown in drawings.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to accompanying drawings.

Figure 2:
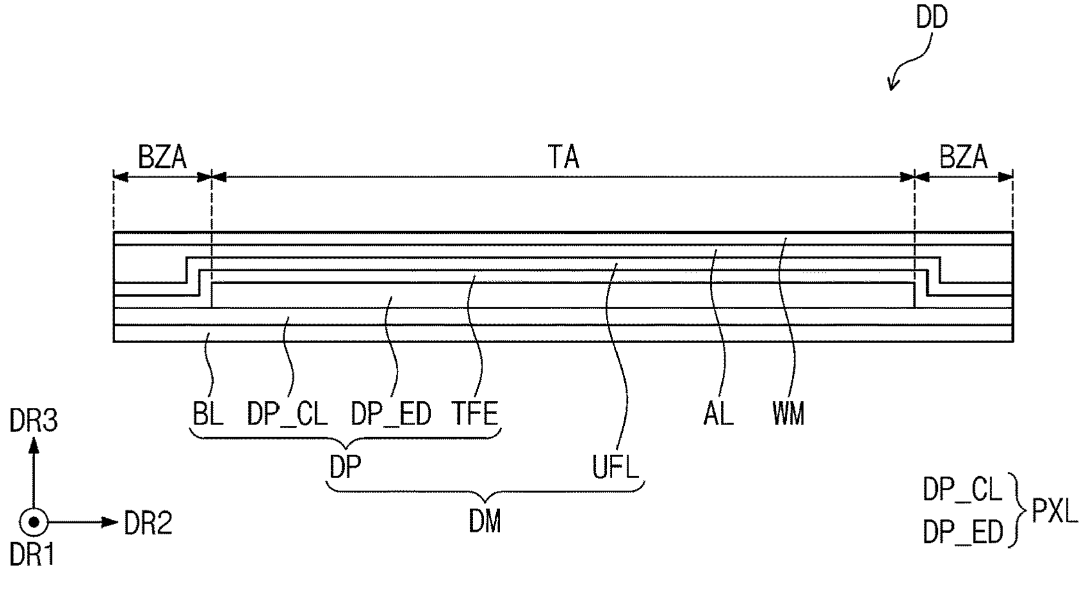
FIG. 2 is a cross-sectional view of an embodiment of a display device according to the disclosure.

FIG. 1 is a perspective view of an embodiment of a display device DD according to the disclosure. FIG. 2 is a cross-sectional view of an embodiment of a display device DD according to the disclosure.

Referring to FIGS. 1 and 2, the display device DD may be a mobile phone, a tablet, a car navigation system, a game console, or a wearable device, but is not limited thereto. An embodiment in which the display device DD is a smartphone is illustrated in FIG. 1.

In addition, although a rigid type display device DD having the form of a bar is illustrated in FIG. 1 in an embodiment, the disclosure is not particularly limited thereto. In an embodiment, the display device DD may be a foldable, rollable, or slidable display device DD, for example.

An upper surface of the display device DD may be defined as a display surface IS and the display surface IS may have a plane defined by a first direction DR1 and a second direction DR2. Images IM generated by the display device DD may be provided to the user through the display surface IS.

Hereinafter, a normal direction substantially perpendicular to a plane defined by the first direction DR1 and the second direction DR2 is defined as a third direction DR3. In the specification, the meaning of "when viewed from above a plane" may mean "when viewed in the third direction DR3". That is, the plane may be parallel to a surface defined by the first direction DR1 and the second direction DR2.

The display surface IS may be divided into a transparent area TA and a bezel area BZA. The transparent area TA may be an area in which the images IM are displayed. The user visually perceives the images IM through the transparent area TA. In this embodiment, the transparent area TA is illustrated in the shape of a quadrangle whose vertexes are rounded. However, this is illustrated as an example. The transparent area TA may have various shapes, such as a rectangle, a circle, or a square, and may not be limited to a particular embodiment.

The bezel area BZA is adjacent to the transparent area TA. The bezel area BZA may have a predetermined color. The bezel area BZA may surround the transparent area TA. Accordingly, the shape of the transparent area TA may be defined substantially by the bezel area BZA. However, this is illustrated as an example. The bezel area BZA may be disposed adjacent to only one side of the transparent area TA or may be omitted.

The display device DD may sense an external input applied from the outside. The external input may include various types of inputs that are provided from the outside of the display device DD. In an embodiment, as well as a contact by a part of a body such as a user's hand US_F, the external input may include an external input (e.g., hovering) that is applied in a state where the user's hand US_F approaches the display device DD or is adjacent to the display device DD within a predetermined distance, for example. In addition, the external input may be provided in various types such as force, pressure, temperature, light, or the like. The external input may be provided by a separate device, e.g., an active pen or a digitizer pen. In addition, the display device DD may detect a user's biometric information provided from the outside or measure the brightness of surroundings.

The exterior of the display device DD may be constituted by a window WM and a housing EDC. In an embodiment, the window WM and the housing EDC may be coupled to each other, and other components of the display device DD, such as a display module DM, may be accommodated therein.

A front surface of the window WM defines the display surface IS of the display device DD. The window WM may include an optically transparent material. In an embodiment, the window WM may include glass or plastic, for example. The window WM may include a multi-layer structure or a single-layer structure. In an embodiment, the window WM may include a plurality of plastic films bonded by an adhesive or may have a glass substrate and a plastic film bonded by an adhesive, for example.

The housing EDC may include a material whose rigidity is relatively high. In an embodiment, the housing EDC may include glass, plastic, or metal or may include a plurality of frames and/or plates that consist of any combinations thereof, for example. The housing EDC may stably protect components of the display device DD accommodated in the inner space from an external impact. Although not illustrated, a battery module for supplying power desired for an overall operation of the display device DD may be disposed between the display module DM and the housing EDC.

Referring to FIG. 2, the display device DD may include the display module DM, an adhesive layer AL, and the window WM, and the display module DM may include a display panel DP and an upper functional layer UFL.

The display panel DP may be a component that substantially generates the images IM (refer to FIG. 1). The display panel DP may be a light-emitting display panel. In an embodiment, the display panel DP may be an organic light-emitting display panel, an inorganic light-emitting display panel, an organic-inorganic light-emitting display panel, a quantum dot display panel, a micro-light-emitting diode ("micro-LED") display panel, or a nano-LED display panel. Hereinafter, the description will be given under the condition that the display panel DP is the organic light-emitting display panel.

The display panel DP may include a base layer BL, a pixel layer PXL, and an encapsulation layer TFE. The display panel DP in an embodiment of the disclosure may be a flexible display panel or a rigid display panel. In an embodiment, the display panel DP may be a foldable display panel that folds around a folding axis, a rollable display panel that at least partially rolls around a rotation axis, or a slidable display panel, for example.

The base layer BL may include a synthetic resin layer. The synthetic resin layer may be a polyimide-based resin layer, and the material thereof is not particularly limited. Besides, the base layer BL may include a glass substrate, a metal substrate, an organic/inorganic composite material substrate, etc.

The pixel layer PXL may be disposed on the base layer BL. The pixel layer PXL may include a circuit layer DP_CL and an element layer DP_ED.

The circuit layer DP_CL may be disposed between the base layer BL and the element layer DP_ED. The circuit layer DP_CL may include at least one insulating layer and a circuit element. Below, the insulating layer included in the circuit layer DP_CL is also referred to as an "intermediate insulating layer". The intermediate insulating layer may include at least one intermediate inorganic film and at least one intermediate organic film.

The circuit element may include a pixel driving circuit PDC (refer to FIG. 4A) included in each of a plurality of pixels PX (refer to FIG. 3) for displaying images, and a sensor driving circuit O_SD (refer to FIG. 4A) included in each of a plurality of sensors FX (refer to FIG. 3) for recognizing external information. The circuit layer DP_CL may further include signal lines connected to the pixel driving circuit PDC (refer to FIG. 4A) and/or the sensor driving circuit O_SD (refer to FIG. 4A). In an embodiment of the disclosure, the plurality of sensors FX may include a first sensor FX1 (refer to FIG. 5) that senses a fingerprint and a second sensor FX2 (refer to FIG. 5) that senses illumination, A detailed description of this will be described later.

The element layer DP_ED may include a light-emitting element ED (refer to FIG. 4A) included in each of the plurality of pixels PX and a photodetector OPD (refer to FIG. 4A) included in each of the sensors FX. In an embodiment of the disclosure, the photodetector OPD may be a photodiode, e.g., an organic photodiode. The photodetector OPD may be a sensor that senses a light reflected by a fingerprint of the user or reacts to a light. The circuit layer DP_CL and the element layer DP_ED will be described in detail with reference to FIG. 4B.

The encapsulation layer TFE encapsulates the element layer DP_ED. The encapsulation layer TFE may include at least one organic film and at least one inorganic film. The inorganic film may include an inorganic material and may protect the element layer DP_ED from moisture/oxygen. The inorganic film may include a silicon nitride layer, a silicon oxynitride layer, a silicon oxide layer, a titanium oxide layer, an aluminum oxide layer, or the like but is not specially limited thereto. The organic film may include an organic material and may protect the element layer DP_ED from foreign objects such as dust particles.

The upper functional layer UFL may be disposed on the display panel DP. The upper functional layer UFL may be formed on the display panel DP through consecutive processes, but the disclosure is not limited thereto.

The upper functional layer UFL may include a sensor layer for detecting coordinates of an external input and an antireflection layer for reducing reflectance of external light incident from the outside. The sensor layer may be disposed on the display panel DP, and the antireflection layer may be disposed on the sensor layer. However, the disclosure is not limited thereto. In an embodiment, the upper functional layer UFL may include the sensor layer alone or the antireflection layer alone, for example.

The antireflection layer may include color filters, a black matrix, and a planarization layer. The color filters may have a predetermined arrangement. In an embodiment, the color filters may be arranged in consideration of colors of lights emitted from pixels included in the display panel DP, for example. In another embodiment, the antireflection layer may include a black matrix and a reflection control layer. The reflection control layer may selectively absorb light of predetermined bands among light reflected from inside the display panel DP and/or the electronic device or incident light from the outside of the display panel DP and/or the electronic device. In another embodiment, the antireflection layer may be a polarizing film.

The display device DD in an embodiment of the disclosure may further include the adhesive layer AL. The window WM may be attached to the upper functional layer UFL by the adhesive layer AL. The adhesive layer AL may include an optical clear adhesive, an optically clear adhesive resin, or a pressure sensitive adhesive ("PSA").

Figure 3:
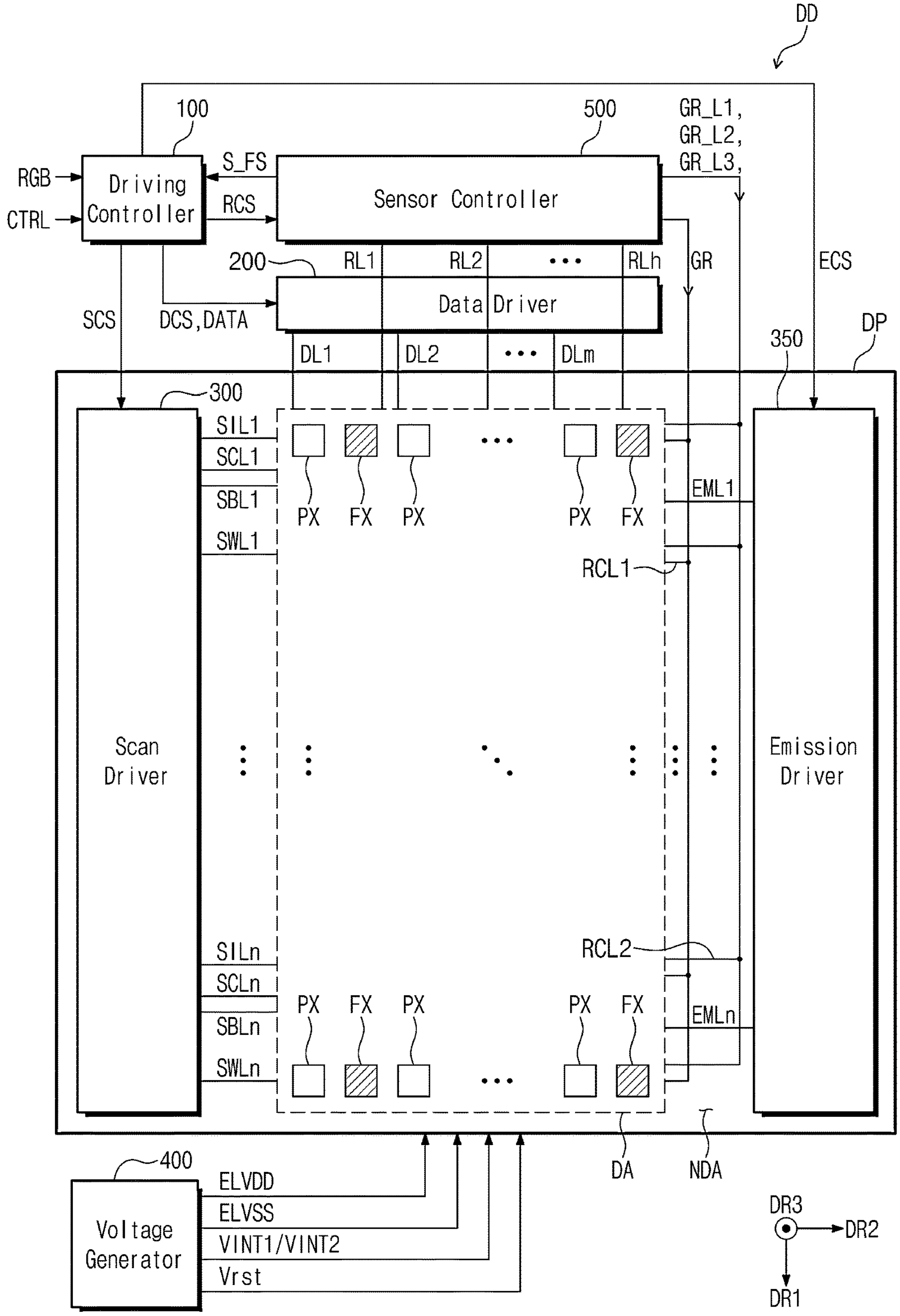
FIG. 3 is a block diagram of an embodiment of a display device according to the disclosure.

FIG. 3 is a block diagram of an embodiment of the display device DD according to the disclosure.

Referring to FIG. 3, the display device DD may include the display panel DP, a panel driver (or referred to as a driving circuit), and a driving controller 100. In an embodiment of the disclosure, the panel driver includes a data driver 200, a scan driver 300, an emission driver 350, a voltage generator 400, and a sensor controller 500.

The display panel DP may include a display area DA corresponding to the transparent area TA (refer to FIG. 1) and a non-display area NDA corresponding to the bezel area BZA (refer to FIG. 1).

The display panel DP may include the plurality of pixels PX disposed in the display panel DP and the plurality of sensors FX disposed in the display panel DP. In an embodiment of the disclosure, each of the plurality of sensors FX may be disposed between two adjacent pixels PX. The plurality of pixels PX and the plurality of sensors FX may be alternately disposed on the first and second directions DR1 and DR2. However, the disclosure is not limited thereto. Two or more pixels PX may be disposed between two sensors FX adjacent to each other on the first direction DR1 from among the plurality of sensors FX, or two or more pixels PX may be disposed between two sensors FX adjacent to each other on the second direction DR2 from among the plurality of sensors FX.

The display panel DP may further include initialization scan lines SIL1 to SILn, compensation scan lines SCL1 to SCLn, write scan lines SWL1 to SWLn, black scan lines SBL1 to SBLn, emission control lines EML1 to EMLn, data lines DL1 to DLm, and readout lines RL1 to RLh. Here, n, m and h may be natural numbers.

The initialization scan lines SIL1 to SILn, the compensation scan lines SCL1 to SCLn, the write scan lines SWL1 to SWLn, the black scan lines SBL1 to SBLn, and the emission control lines EML1 to EMLn may extend in the second direction DR2. The initialization scan lines SIL1 to SILn, the compensation scan lines SCL1 to SCLn, the write scan lines SWL1 to SWLn, the black scan lines SBL1 to SBLn, and the emission control lines EML1 to EMLn may be arranged to be spaced from each other in the first direction DR1. The data lines DL1 to DLm and the readout lines RL1 to RLh may extend in the first direction DR1 and may be arranged to be spaced from each other in the second direction DR2.

The plurality of pixels PX may be electrically connected to the initialization scan lines SIL1 to SILn, the compensation scan lines SCL1 to SCLn, the write scan lines SWL1 to SWLn, the black scan lines SBL1 to SBLn, the emission control lines EML1 to EMLn, and the data lines DL1 to DLm, respectively. In an embodiment, each of the plurality of pixels PX may be electrically connected to four scan lines, for example. However, the number of scan lines connected to each pixel PX is not limited thereto and may be changed.

The plurality of sensors FX is electrically connected to the readout lines RL1 to RLh, respectively. One sensor FX may be electrically connected to one scan line, e.g., one write scan line among the write scan lines SWL1 to SWLn. However, the disclosure is not limited thereto. The number of scan lines connected to each sensor FX may be variable.

In an embodiment of the disclosure, the number of readout lines RL1 to RLh may correspond to one-half of the number of data lines DL1 to DLm. However, the disclosure is not limited thereto. In an alternative embodiment, the number of readout lines RL1 to RLh may correspond to ¼ or ⅛ of the number of data lines DL1 to DLm.

The driving controller 100 receives an image signal RGB and a control signal CTRL. The driving controller 100 generates an image data signal DATA by converting a data format of the image signal RGB in compliance with the specification for an interface with the data driver 200. The driving controller 100 outputs a first control signal SCS, a second control signal ECS, a third control signal DCS, and a fourth control signal RCS.

The data driver 200 receives the third control signal DCS and the image data signal DATA from the driving controller 100. The data driver 200 converts the image data signal DATA into data signals and outputs the data signals to the plurality of data lines DL1 to DLm to be described later. The data signals are analog voltages corresponding to grayscale values of the image data signal DATA.

The scan driver 300 receives the first control signal SCS from the driving controller 100. The scan driver 300 may output scan signals to scan lines in response to the first control signal SCS. In an embodiment, in response to the first control signal SCS, the scan driver 300 may output initialization scan signals to the initialization scan lines SIL1 to SILn and output compensation scan signals to the compensation scan lines SCL1 to SCLn, for example. Also, in response to the first control signal SCS, the scan driver 300 may output write scan signals to the write scan lines SWL1 to SWLn and may output black scan signals to the black scan lines SBL1 to SBLn.

The scan driver 300 may be disposed in the non-display area NDA of the display panel DP. However, the disclosure is not particularly limited thereto. In an embodiment, at least a portion of the scan driver 300 may be disposed in the display area DA, for example.

The emission driver 350 may be disposed in the non-display area NDA of the display panel DP. The emission driver 350 receives the second control signal ECS from the driving controller 100. The emission driver 350 may output emission control signals to the emission control lines EML1 to EMLn in response to the second control signal ECS. In an alternative embodiment, the scan driver 300 may be connected to the emission control lines EML1 to EMLn. In this case, the emission driver 350 may be omitted, and the scan driver 300 may output emission control signals to the emission control lines EML1 to EMLn.

The voltage generator 400 may generate voltages desired for an operation of the display panel DP. In an embodiment, the voltage generator 400 may generate a first driving voltage ELVDD, a second driving voltage ELVSS, a first initialization voltage VINT1, a second initialization voltage VINT2, and a reset voltage Vrst.

The sensor controller 500 may provide a first reset control signal GR and second reset control signals GR_L1, GR_L2, and GR_L3 to the display panel DP through separate lines different from each other. The first reset control signal GR may be provided to the display panel DP through a first reset control line RCL1. The second reset control signals GR_L1, GR_L2, and GR_L3 may be provided to the display panel DP through a second reset control line RCL2.

The second reset control signals GR_L1, GR_L2, and GR_L3 may include the (2-1)-th reset control signal GR_L1, the (2-2)-th reset control signal GR_L2, and the (2-3)-th reset control signal GR_L3. The (2-1)-th reset control signal GR_L1, the (2-2)-th reset control signal GR_L2, and the (2-3)-th reset control signal GR_L3 may be provided to different areas of the display area DA, respectively. This will be described later.

The sensor controller 500 may receive the fourth control signal RCS from the driving controller 100. The sensor controller 500 may receive sensing signals from the readout lines RL1 to RLh in response to the fourth control signal RCS. The sensor controller 500 may process the sensing signals received from the readout lines RL1 to RLh and may provide processed detection signals S_FS to the driving controller 100.

Figure 4A:
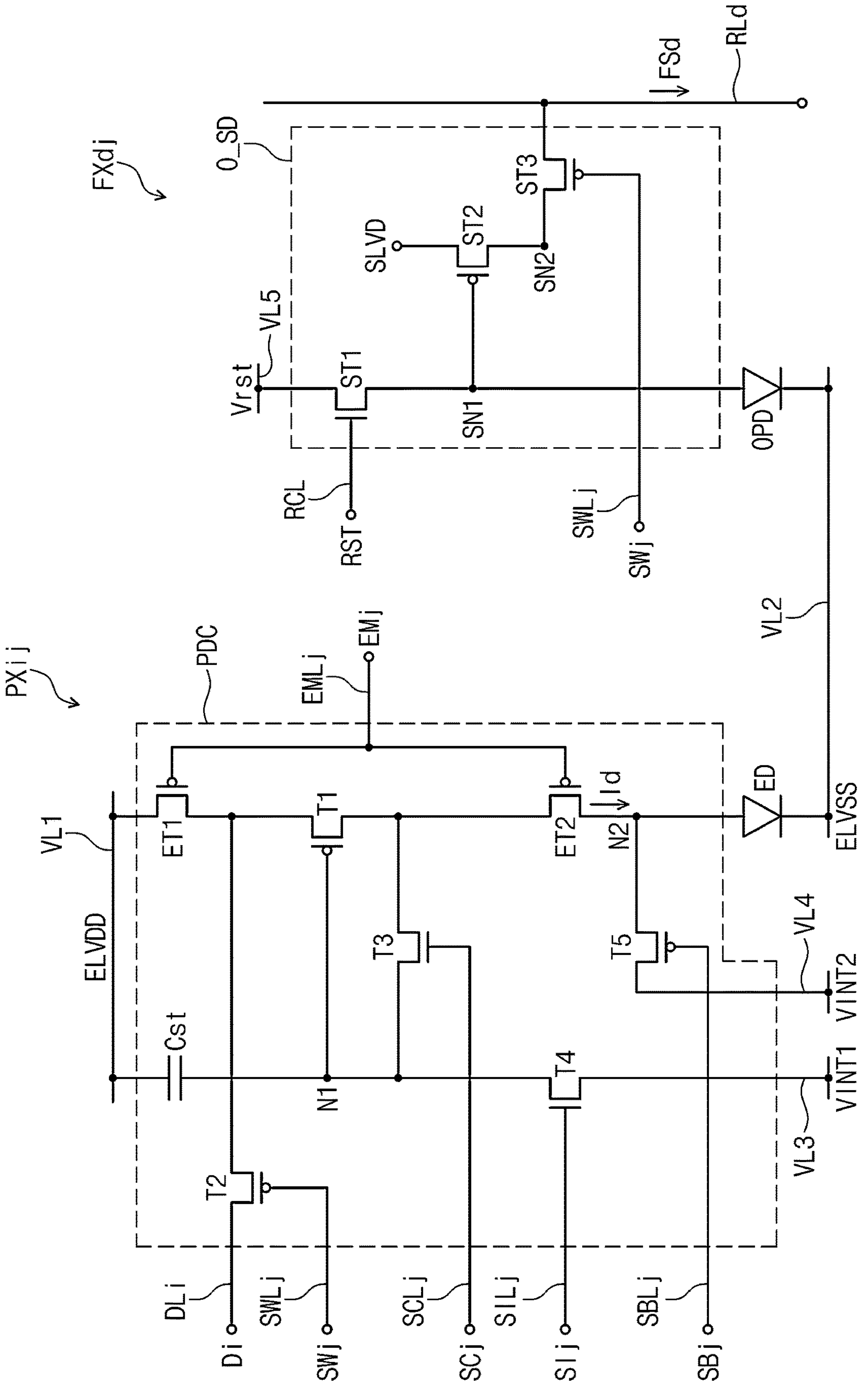
FIG. 4A is an equivalent circuit diagram of an embodiment of a pixel and a sensor according to the disclosure.

FIG. 4A is an equivalent circuit diagram of an embodiment of a pixel PXij and a sensor FXdj, according to the disclosure. Here, i and j may be natural numbers equal to or less than m and n, respectively.

FIG. 4A shows an equivalent circuit diagram of one pixel PXij among a plurality of pixels PX (refer to FIG. 3). A circuit structure of the pixel PXij will be described below. The plurality of pixels PX has the same structure as each other, and thus, detailed description associated with the other pixels PX will be omitted to avoid redundancy. Also, an equivalent circuit diagram of one sensor FXdj of the plurality of sensors FX illustrated in FIG. 3 is illustrated in FIG. 4A as an example. A circuit structure of the sensor FXdj will be described below. The plurality of sensors FX has the same structure as each other, and thus, detailed description associated with the other sensors FX will be omitted to avoid redundancy.

Referring to FIGS. 3 and 4A, the pixel PXij may be connected to the i-th data line DLi of the data lines DL1 to DLm, the j-th initialization scan line SILj of the initialization scan lines SIL1 to SILn, the j-th compensation scan line SCLj of the compensation scan lines SCL1 to SCLn, the j-th write scan lines SWLj of the write scan lines SWL1 to SWLn, the j-th black scan line SBLj of the black scan lines SBL1 to SBLn, and the j-th emission control line EMLj of the emission control lines EML1 to EMLn.

The pixel PXij includes a light-emitting element ED and the pixel driving circuit PDC. The light-emitting element ED may be a light-emitting diode. In an embodiment of the disclosure, the light-emitting element ED may be an organic light-emitting diode including an organic emission layer, but the disclosure is not particularly limited thereto.

The pixel driving circuit PDC includes first to fifth transistors T1, T2, T3, T4, and T5, first and second emission control transistors ET1 and ET2, and one capacitor Cst.

At least one of the first to fifth transistors T1, T2, T3, T4, and T5 and the first and second emission control transistors ET1 and ET2 may be a transistor having a low-temperature polycrystalline silicon ("LTPS") semiconductor layer. At least one of the first to fifth transistors T1, T2, T3, T4, and T5 and the first and second emission control transistors ET1 and ET2 may be a transistor having an oxide semiconductor layer. In an embodiment, the third and fourth transistors T3 and T4 may be oxide semiconductor transistors, and the first, second, and fifth transistors T1, T2, and T5 and the first and second emission control transistors ET1 and ET2 may be LTPS transistors, for example.

In detail, the first transistor T1 having a direct influence on brightness of the display device DD (refer to FIG. 1) may include a semiconductor layer including or consisting of a polycrystalline silicon having relatively high reliability, and thus, a high-resolution display device may be implemented. Since carrier mobility of the oxide semiconductor is relatively high and a leakage current of the oxide semiconductor is low, the voltage drop is not significant even though the driving time is long. That is, even during low-frequency driving, a color of an image is not significantly changed by the voltage drop. This means that the low-frequency driving is possible. As described above, because a leakage current of the oxide semiconductor is small, at least one of the third transistor T3 and the fourth transistor T4 connected to a gate electrode of the first transistor T1 may be implemented with the oxide semiconductor, thus preventing the leakage current capable of flowing into the gate electrode and reducing power consumption.

Some of the first to fifth transistors T1, T2, T3, T4, and T5 and the first and second emission control transistors ET1 and ET2 may be P-type transistors, and remaining transistors thereof may be N-type transistors. In an embodiment, the first, second, and fifth transistors T1, T2, and T5 and the first and second emission control transistors ET1 and ET2 are P-type transistors, and the third and fourth transistors T3 and T4 may be N-type transistors, for example.

A configuration of the pixel driving circuit PDC according to the disclosure is not limited to the embodiment illustrated in FIG. 4A. The pixel driving circuit PDC illustrated in FIG. 4A is only an example, and the configuration of the pixel driving circuit PDC may be modified and implemented. In an embodiment, each of the first to fifth transistors T1, T2, T3, T4, and T5 and the first and second emission control transistors ET1 and ET2 may be a P-type transistor or an N-type transistor, for example.

The j-th initialization scan line SILj, the j-th compensation scan line SCLj, the j-th write scan line SWLj, the j-th black scan line SBLj, and the j-th emission control line EMLj may transfer a j-th initialization scan signal SIj, a j-th compensation scan signal SCj, a j-th write scan signal SWj, a j-th black scan signal SBj, and a j-th emission control signal EMj to the pixel PXij, respectively. The i-th data line DLi transfers an i-th data signal Di to the pixel PXij. The i-th data signal Di may have a voltage level corresponding to the image signal RGB input to the display device DD (refer to FIG. 3).

The first and second driving voltage lines VL1 and VL2 may transfer the first and second driving voltages ELVDD and ELVSS to the pixel PXij, respectively. Also, first and second initialization voltage lines VL3 and VL4 may transfer the first and second initialization voltages VINT1 and VINT2 to the pixel PXij, respectively.

The first transistor T1 is connected between the first driving voltage line VL1 receiving the first driving voltage ELVDD and the light-emitting element ED. The first transistor T1 may include a first electrode connected to the first driving voltage line VL1 via the first emission control transistor ET1, a second electrode connected to an anode AE of the light-emitting element ED (refer to FIG. 4A) via the second emission control transistor ET2, and a third electrode (e.g., gate electrode) connected to one end (e.g., a first node N1) of the capacitor Cst. The first transistor T1 may receive the data signal Di transferred through the i-th data line DLi depending on a switching operation of the second transistor T2 and then may supply a driving current Id to the light-emitting element ED.

The second transistor T2 is connected between the i-th data line DLi and the first electrode of the first transistor T1. The second transistor T2 may include a first electrode connected to the i-th data line DLi, a second electrode connected to the first electrode of the first transistor T1, and a third electrode (e.g., gate electrode) connected to the j-th write scan line SWLj. The second transistor T2 may be turned on depending on the write scan signal SWj transferred through the j-th write scan line SWLj and then may transfer the i-th data signal Di transferred from the i-th data line DLi to the first electrode of the first transistor T1.

The third transistor T3 is connected between the second electrode of the first transistor T1 and the first node N1. The third transistor T3 may include a first electrode connected to the third electrode of the first transistor T1, a second electrode connected to the second electrode of the first transistor T1, and a third electrode (e.g., gate electrode) connected to the j-th compensation scan line SCLj. The third transistor T3 may be turned on depending on the j-th compensation scan signal SCj transferred through the j-th compensation scan line SCLj and may then connect the third electrode and the second electrode of the first transistor T1. In this case, the first transistor T1 may be diode-connected.

The fourth transistor T4 is connected between the first initialization voltage line VL3 to which the first initialization voltage VINT1 is applied and the first node N1. The fifth transistor T4 may include a first electrode connected to the first initialization voltage line VL3 to which the first initialization voltage VINT1 is applied, a second electrode connected to the first node N1, and a third electrode (e.g., gate electrode) connected to the j-th initialization scan line SILj. The fourth transistor T4 is turned on depending on the j-th initialization scan signal SIj transferred through the j-th initialization scan line SILj. The fourth transistor T4 thus turned on transfers the first initialization voltage VINT1 to the first node N1 such that a potential of the third electrode of the first transistor T1 (i.e., a potential of the first node N1) is initialized.

The first emission control transistor ET1 may include a first electrode connected to the first driving voltage line VL1, a second electrode connected to the first electrode of the first transistor T1, and a third electrode (e.g., gate electrode) connected to the j-th emission control line EMLj.

The second emission control transistor ET2 may include a first electrode connected to the second electrode of the first transistor T1, a second electrode connected to the anode AE of the light-emitting element ED (refer to FIG. 4B), and a third electrode (e.g., gate electrode) connected to the j-th emission control line EMLj.

The first and second emission control transistors ET1 and ET2 may be simultaneously turned on depending on the j-th emission control signal EMj transferred through the j-th emission control line EMLj. The first driving voltage ELVDD applied through the first emission control transistor ET1 thus turned on may be compensated for through the diode-connected first transistor T1 and then may be transferred to the light-emitting element ED.

The fifth transistor T5 may include a first electrode connected to the second initialization voltage line VL4 through which the second initialization voltage VINT2 is transferred, a second electrode connected to the second electrode of the second emission control transistor ET2, and a third electrode (e.g., gate electrode) connected to the j-th black scan line SBLj. A voltage level of the second initialization voltage VINT2 may be lower than or equal to that of the first initialization voltage VINT1.

As described above, one end of the capacitor Cst is connected to the third electrode of the first transistor T1, and an opposite end of the capacitor Cst is connected to the first driving voltage line VL1. A cathode of the light-emitting element ED may be connected to the second driving voltage line VL2 that transfers the second driving voltage ELVSS. A voltage level of the second driving voltage ELVSS may be lower than a voltage level of the first driving voltage ELVDD.

The sensor FX may be connected to a d-th readout line RLd among the readout lines RL1 to RLh, the j-th write scan line SWLj (or referred to as an output control line), and a reset control line RCL. Here, d is a natural number equal to or less than h.

The sensor FX may include the photodetector OPD (or referred to as a sensing element) and a sensor driving circuit O_SD.

The photodetector OPD may be a photodiode. In an embodiment of the disclosure, the photodetector OPD may be an organic photodiode including an organic material as a photoelectric conversion layer. An anode AE1 of the photodetector OPD (refer to FIG. 4B) may be connected to a first sensing node SN1. A cathode CE of the photodetector OPD (refer to FIG. 4B) may be connected to the second driving voltage line VL2 that transfers the second driving voltage ELVSS. In FIG. 4A, the sensor FXdj includes one photodetector OPD in an embodiment, but is not particularly limited thereto. In an embodiment, the sensor FXdj may include z photodetectors connected in parallel. Here, 'z' may be an integer of 2 or more, for example.

The sensor driving circuit O_SD may include three transistors ST1 to ST3. The three transistors ST1 to ST3 may include the reset transistor ST1, the amplification transistor ST2, and the output transistor ST3. At least one of the reset transistor ST1, the amplification transistor ST2, and the output transistor ST3 may be an oxide semiconductor transistor. In an embodiment of the disclosure, the reset transistor ST1 may be an oxide semiconductor transistor, and the amplification transistor ST2 and the output transistor ST3 may be LTPS transistors. However, the disclosure is not limited thereto. In an embodiment, at least the reset transistor ST1 and the output transistor ST3 may be oxide semiconductor transistors, and the amplification transistor ST2 may be an LTPS semiconductor transistor, for example.

Also, some of the reset transistor ST1, the amplification transistor ST2, and the output transistor ST3 may be P-type transistors, and the other(s) thereof may be an N-type transistor. In an embodiment of the disclosure, the amplification transistor ST2 and the output transistor ST3 may be P-type transistors, and the reset transistor ST1 may be an N-type transistor. However, the disclosure is not limited thereto. In an embodiment, all the transistors ST1, ST2, and ST3 may be N-type transistors or P-type transistors, for example.

Referring to FIGS. 3 and 4A, the reset transistor ST1 may include a first electrode connected to the third initialization voltage line VL5 to receive the reset voltage Vrst, a second electrode connected to the first sensing node SN1, and a third electrode receiving a reset control signal RST. The third electrode may be also referred to as a "gate electrode".

The second electrode of the reset transistor ST1 may be electrically connected to the photodetector OPD.

The reset transistor ST1 may reset the potential of the first sensing node SN1 to the reset voltage Vrst in response to the reset control signal RST. The reset control signal RST may be a signal provided through the reset control line RCL. The reset control signal RST may include the first reset control signal GR and the second reset control signals GR_L1, GR_L2, and GR_L3. The reset control line RCL may include the first reset control line RCL1 and the second reset control line RCL2 different from the first reset control line RCL1. The first reset control signal GR may be provided to the first reset control line RCL1. The second reset control signals GR_L1, GR_L2, and GR_L3 may be provided to the second reset control line RCL2. That is, the first reset control signal GR and the second reset control signals GR_L1, GR_L2, and GR_L3 may be signals provided through different reset control lines RCL1 and RCL2.

The amplification transistor ST2 may include a first electrode receiving a sensing driving voltage SLVD, a second electrode connected to a second sensing node SN2, and a third electrode connected to the first sensing node SN1. The amplification transistor ST2 may be turned on depending on a potential of the first sensing node SN1 and may apply the sensing driving voltage SLVD to the second sensing node SN2. In an embodiment of the disclosure, the sensing driving voltage SLVD may correspond to one of the first driving voltage ELVDD and the first and second initialization voltages VINT1 and VINT2. When the sensing driving voltage SLVD is the first driving voltage ELVDD, the first electrode of the amplification transistor ST2 may be electrically connected to the first driving voltage line VL1. When the sensing driving voltage SLVD is the first initialization voltage VINT1, the first electrode of the amplification transistor ST2 may be electrically connected to the first initialization voltage line VL3; when the sensing driving voltage SLVD corresponds to the second initialization voltage VINT2, the first electrode of the amplification transistor ST2 may be electrically connected to the second initialization voltage line VLA.

The output transistor ST3 may include a first electrode connected to the second sensing node SN2, a second electrode connected to the d-th readout line RLd, and a third electrode receiving an output control signal. The output transistor ST3 may transfer a readout signal FSd to the d-th readout line RLd in response to the output control signal. The output control signal may be the j-th write scan signal SWj (or referred to as j-th output control signal) that is supplied through the j-th write scan line SWLj. That is, the output transistor ST3 may receive the j-th write scan signal SWj supplied from the j-th write scan line SWLj as the output control signal.

The reset interval may be defined as a rising interval (i.e., a high-level interval) of the reset control line RCL. When the reset control signal RST with the relatively high level is supplied through the reset control line RCL, the reset transistor ST1 may be turned on. In an alternative embodiment, when the reset transistor ST1 includes or consists of a p-channel metal-oxide-semiconductor ("PMOS") transistor, the reset control signal RST with a relatively low level may be supplied to the reset control line RCL during the reset interval. During the reset interval, the first sensing node SN1 may be reset to a potential corresponding to the reset voltage Vrst. In an embodiment of the disclosure, the reset voltage Vrst may have a lower voltage level than the second driving voltage ELVSS.

The photodetector OPD of the sensor FX may be exposed to light during an emission interval of the light-emitting element ED. In an alternative embodiment, the photodetector OPD of the sensor FX may be exposed to light by external light. The voltage of the first sensing node SN1 may maintain the reset voltage Vrst in the reset interval, and as the photodetector OPD is exposed to light, the voltage of the first sensing node SN1 may be gradually shifted to the second driving voltage ELVSS. The amplification transistor ST2 may be a source follower amplifier that generates a source-drain current in proportion to the amount of charges of the first sensing node SN1, which are input to the third electrode of the amplification transistor ST2.

The j-th write scan signal SWj having the relatively low level may be supplied to the output transistor ST3 through the j-th write scan line SWLj during the output interval. When the output transistor ST3 is turned on in response to the j-th write scan signal SWj having the relatively low level, the readout signal Fsd corresponding to a current flowing through the amplification transistor ST2 may be output to the d-th readout line RLd.

The sensor controller 500 which has received the readout signal FSd may generate a detection signal S_FS by processing the readout signal FSd and provide the detection signal S_FS to the driving controller 100. The driving controller 100 may obtain an image based on the detection signal S_FS. Details related thereto will be given later.

Figure 4B:
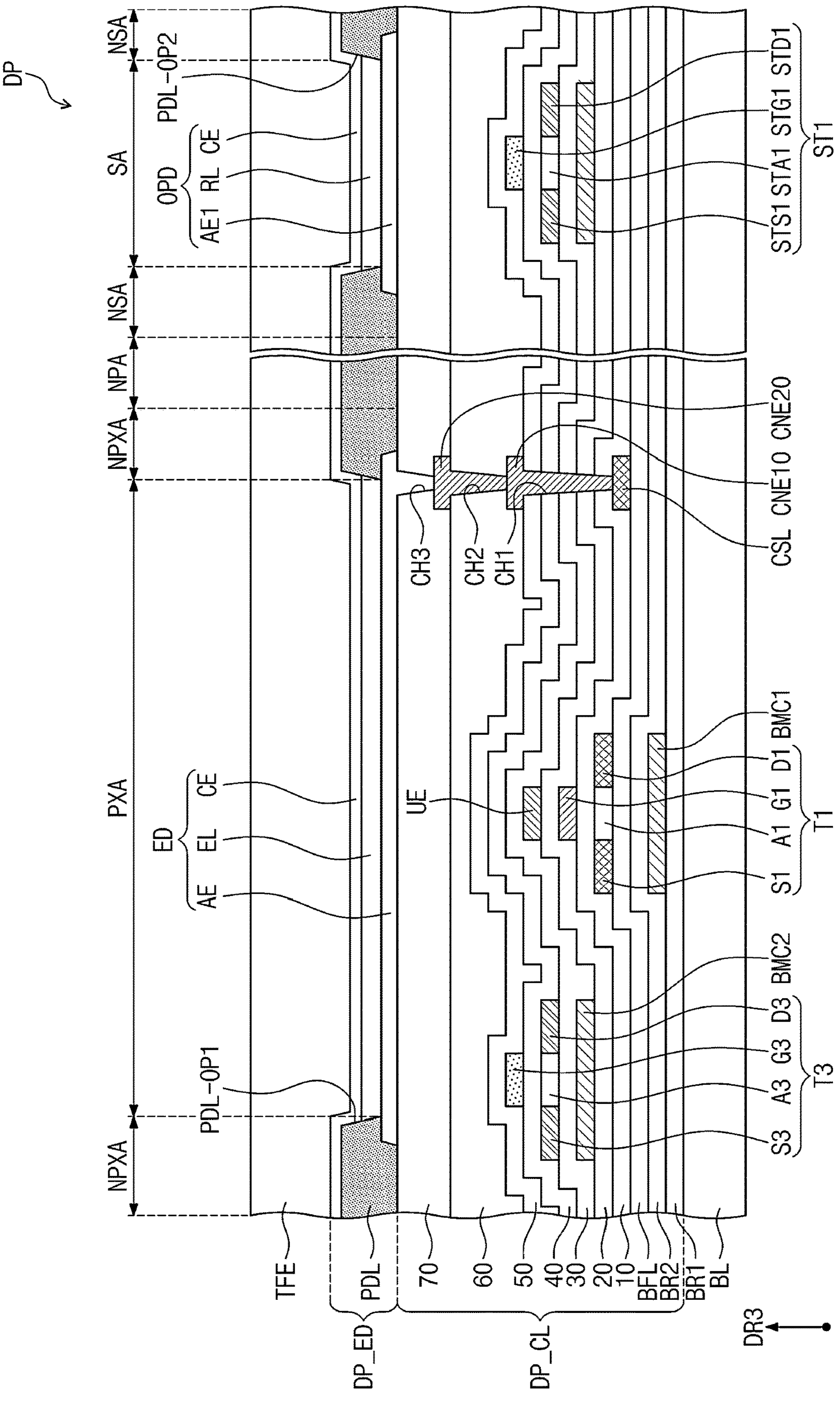
FIG. 4B is a cross-sectional view of an embodiment of a display panel, according to the disclosure.

FIG. 4B is a cross-sectional view of an embodiment of a display panel, according to the disclosure.

Referring to FIGS. 4A and 4B, the display panel DP may include the base layer BL, the circuit layer DP_CL disposed on the base layer BL, the element layer DP_ED, and the encapsulation layer TFE.

At least one inorganic layer is formed on an upper surface of the base layer BL. The inorganic layer may include at least one of aluminum oxide, titanium oxide, silicon oxide, silicon oxynitride, zirconium oxide, and hafnium oxide. The inorganic layer may consist of multiple layers. The multiple inorganic layers may constitute barrier layers BR1 and BR2 and/or a buffer layer BFL, which will be described later. The barrier layers BR1 and BR2 and the buffer layer BFL may be disposed selectively.

The barrier layers BR1 and BR2 may prevent foreign substances from entering from the outside. The barrier layers BR1 and BR2 may include a silicon oxide layer and a silicon nitride layer. A plurality of silicon oxide layers and a plurality of silicon nitride layers may be provided and the plurality of silicon oxide layers and the plurality of silicon nitride layers may be alternately stacked.

The buffer layer BFL may be disposed on the barrier layers BR1 and BR2. The buffer layer BFL improves a bonding force between the base layer BL and a semiconductor pattern and/or a conductive pattern. The buffer layer BFL may include a silicon oxide layer and a silicon nitride layer. The silicon oxide layers and the silicon nitride layers may be alternately stacked.

The first semiconductor pattern may be disposed on the buffer layer BFL. The first semiconductor pattern may include a silicon semiconductor. In an embodiment, the silicon semiconductor may include amorphous silicon, or polycrystalline silicon, for example. In an embodiment, the first semiconductor pattern may include low-temperature polysilicon, for example.

FIG. 4B shows only a portion of the first semiconductor pattern disposed on the buffer layer BFL, and another portion of the first semiconductor pattern may be further disposed in another portion of the first semiconductor pattern in another area. The first semiconductor patterns may be arranged across the pixels in compliance with a predetermined rule. An electrical property of the first semiconductor pattern may vary depending on whether it is doped. The first semiconductor pattern may include a first area whose conductivity is relatively high and a second area whose conductivity is relatively low. The first area may be doped with an N-type dopant or a P-type dopant. A P-type transistor may include a doping area doped with the P-type dopant, and an N-type transistor may include a doping area doped with the N-type dopant. The second area may be a non-doping area or may be an area doped at a concentration lower than the concentration of the first area.

The conductivity of the first area may be higher than the conductivity of the second area, and the first area may substantially serve as an electrode or a signal line. The second area may substantially correspond to an active area (or channel) of a transistor. In other words, a portion of the semiconductor pattern may be an active area of a transistor, another portion of the semiconductor pattern may be a source area or a drain area of the transistor, and still another portion of the semiconductor pattern may be a connection electrode or a connection signal line.

A first insulating layer 10 may be disposed on the buffer layer BFL. The first insulating layer 10 may overlap a plurality of pixels in common and may cover the first semiconductor pattern. The first insulating layer 10 may be an inorganic layer and/or an organic layer, and may have a single-layer or multi-layer structure. The first insulating layer 10 may include at least one of aluminum oxide, titanium oxide, silicon oxide, silicon nitride, silicon oxynitride, zirconium oxide, and a hafnium oxide. In this embodiment, the first insulating layer 10 may be a silicon oxide layer having a single layer. An insulating layer of the circuit layer DP_CL to be described later as well as the first insulating layer 10 may be an inorganic layer and/or an organic layer, and may have a single layer structure or a multi-layer structure. The inorganic layer may include at least one of the above-described materials, but is not limited thereto.

A third electrode G1 of the first transistor T1 is disposed on the first insulating layer 10. The third electrode G1 may be a portion of a metal pattern. The third electrode G1 of the first transistor T1 may overlap a channel portion A1 of the first transistor T1. The third electrode G1 of the first transistor T1 may serve as a mask in the process of doping the first semiconductor pattern. The third electrode G1 may include titanium (Ti), silver (Ag), an alloy including or consisting of silver (Ag), molybdenum (Mo), an alloy including or consisting of molybdenum (Mo), aluminum (Al), an alloy including or consisting of aluminum (Al), aluminum nitride (AlN), tungsten (W), tungsten nitride (WN), copper (Cu), indium tin oxide ("ITO"), and indium zinc oxide ("IZO"), but is not specifically limited thereto.

A second insulating layer 20 may be disposed on the first insulating layer 10 and may cover the third electrode G1 of the first transistor T1. The second insulating layer 20 may be an inorganic layer and/or an organic layer, and may have a single-layer structure or a multi-layer structure. The second insulating layer 20 may include at least one of silicon oxide, silicon nitride, and silicon oxynitride. In this embodiment, the second insulating layer 20 may have a multi-layer structure including a silicon oxide layer and a silicon nitride layer.

An upper electrode UE and a second back metal layer BMC2 may be disposed on the second insulating layer 20. The upper electrode UE may overlap the third electrode G1. The upper electrode UE may be a part of a metal pattern. A portion of the third electrode G1 and the upper electrode UE overlapping the portion of the third electrode G1 may define the capacitor Cst (refer to FIG. 4A). In an embodiment of the disclosure, the second insulating layer 20 may be replaced with an insulating pattern. In this case, the upper electrode UE may be disposed on the insulating pattern, and the upper electrode UE may serve as a mask for forming the insulating pattern from the second insulating layer 20.

The second back metal layer BMC2 may be disposed to correspond to a lower portion of an oxide thin film transistor, e.g., the third transistor T3. The second back metal layer BMC2 may receive a constant voltage or signal.

The third insulating layer 30 may be disposed on the second insulating layer 20 and may cover the upper electrode UE and the second back metal layer BMC2. The third insulating layer 30 may have a single-layer or multi-layer structure. In an embodiment, the third insulating layer 30 may have a multi-layer structure including a silicon oxide layer and a silicon nitride layer, for example.

A second semiconductor pattern may be disposed on the third insulating layer 30. The second semiconductor pattern may include an oxide semiconductor. The oxide semiconductor may include a plurality of areas that are distinguished from one another depending on whether metal oxide is reduced. An area (hereinafter referred to as a "reduction area") in which the metal oxide is reduced has higher conductivity than an area (hereinafter referred to as a "non-reduction area") in which the metal oxide is not reduced. The reduction area may substantially serve as a source/drain of a transistor or a signal line. The non-reduction area actually corresponds to an active area (alternatively, a semiconductor area or a channel) of a transistor. In other words, a portion of the second semiconductor pattern may be an active area of a transistor, another portion thereof may be a source area or a drain area of the transistor, and another portion may be a connection electrode or a connection signal line.

A first electrode S3, a channel portion A3, and a second electrode D3 of the third transistor T3 may be formed from the second semiconductor pattern. The first electrode S3 and the second electrode D3 include a metal reduced from a metal oxide semiconductor. The first electrode S3 and the second electrode D3 may extend from the channel portion A3 in directions opposite to each other, when viewed in a cross-sectional view.

A fourth insulating layer 40 may be disposed on the third insulating layer 30. The fourth insulating layer 40 may overlap the plurality of pixels in common and may cover the second semiconductor pattern. The fourth insulating layer 40 may include at least one of aluminum oxide, titanium oxide, silicon oxide, silicon nitride, silicon oxynitride, zirconium oxide, and a hafnium oxide.

A third electrode G3 of the third transistor T3 may be disposed on the fourth insulating layer 40. The third electrode G3 may be a portion of a metal pattern. The third electrode G3 of the third transistor T3 overlaps a channel portion A3 of the third transistor T3. The third electrode G3 may function as a mask in a process of doping the second semiconductor pattern. In an embodiment of the disclosure, the fourth insulating layer 40 may be replaced with an insulating pattern.

A fifth insulating layer 50 may be disposed on the fourth insulating layer 40 and may cover the third electrode G3. The fifth insulating layer 50 may be an inorganic layer.

A first connection electrode CNE10 may be disposed on the fifth insulating layer 50. The first connection electrode CNE10 may be connected to a connection signal line CSL through a first contact hole CH1 penetrating the first to fifth insulating layers 10, 20, 30, 40, and 50.

A sixth insulating layer 60 may be disposed on the fifth insulating layer 50. The sixth insulating layer 60 may be an organic layer. The organic layer may include general purpose polymers such as benzocyclobutene ("BCB"), polyimide, hexamethyldisiloxane ("HMDSO"), polymethylmethacrylate ("PMMA"), or polystyrene ("PS"); a polymer derivative having a phenolic group; an acrylic polymer; an imide-based polymer; an acryl ether polymer; an amide-based polymer; a fluorine-based polymer; a p-xylene-based polymer; a vinyl alcohol-based polymer; or the combination thereof, but is not particularly limited thereto.

A second connection electrode CNE20 may be disposed on the sixth insulating layer 60. The second connection electrode CNE20 may be connected to the first connection electrode CNE10 through a second contact hole CH2 passing through the sixth insulating layer 60. A seventh insulating layer 70 may be disposed on the sixth insulating layer 60 and may cover the second connection electrode CNE20. The seventh insulating layer 70 may be an organic layer.

A first electrode layer may be disposed on the circuit layer DP_CL. A pixel defining layer PDL may be formed on the first electrode layer. The first electrode layer may include the anode AE of the light-emitting element ED and the anode AE1 of the photodetector OPD. The anode AE of the light-emitting element ED and the anode AE1 of the photodetector OPD may be disposed on the seventh insulating layer 70. The anode AE of the light-emitting element ED may be connected to the second connection electrode CNE20 through the third contact hole CH3 passing through the seventh insulating layer 70.

First and second film openings PDL-OP1 and PDL-OP2 may be defined in the pixel defining layer PDL. The first film opening PDL-OP1 may expose at least a portion of the anode AE of the light-emitting element ED. The second film opening PDL-OP2 may expose at least a portion of the anode AE1 of the photodetector OPD.

In an embodiment of the disclosure, the pixel defining layer PDL may further include a black material. The pixel defining layer PDL may further include a black organic dye/pigment such as carbon black or aniline black. The pixel defining layer PDL may be formed by mixing a blue organic material and a black organic material. The pixel defining layer PDL may further include a liquid-repellent organic material.

As illustrated in FIG. 4B, an emission area PXA and a non-emission area NPXA adjacent to the emission area PXA may be defined in the display panel DP. The non-emission area NPXA may surround the emission area PXA. In the illustrated embodiment, the emission area PXA may be defined to correspond to the portion of anode AE, which is exposed by the first film opening PDL-OP1. In an embodiment, a sensing area SA and a non-sensing area NSA adjacent to the sensing area SA may be further defined in the display panel DP.

An emission layer EL may be disposed on the anode AE of the light-emitting element ED. The emission layer EL may be disposed in an area corresponding to the first film opening PDL-OP1. The emission layer EL may generate light of a predetermined color. Although the patterned emission layer EL has been described as an example in the illustrated embodiment, one emission layer may be disposed in a plurality of emission areas commonly. In this case, the emission layer may generate white light or blue light. In addition, the emission layer may have a multi-layer structure referred to as a "tandem".

The emission layer EL may include a relatively low molecular organic material or a relatively high molecular organic material as a light-emitting material. In an alternative embodiment, the emission layer EL may include a quantum dot material as a light-emitting material. The core of a quantum dot may be selected from a group II-VI compound, a group III-V compound, a group IV-VI compound, a group IV element, a group IV compound, and any combinations thereof.

The cathode CE may be disposed on the emission layer EL. In an embodiment of the disclosure, the cathode CE may be disposed in the emission area PXA, the non-emission area NPXA, and a non-pixel area NPA commonly. The pixel PX may not be disposed in the non-pixel area NPA.

The circuit layer DP_CL may further include the sensor driving circuit O_SD. For convenience of description, the reset transistor ST1 of the sensor driving circuit O_SD is illustrated. A first electrode STS1, a channel portion STA1, and a second electrode STD1 of the reset transistor ST1 may be formed from the second semiconductor pattern. The first electrode STS1 and the second electrode STD1 may include a metal reduced from a metal oxide semiconductor. The fourth insulating layer 40 may be disposed to cover the first electrode STS1, the channel portion STA1, and the second electrode STD1 of the reset transistor ST1. The third electrode STG1 of the reset transistor ST1 may be disposed on the fourth insulating layer 40. The third electrode STG1 may be also referred to as a gate electrode STG1. In the illustrated embodiment, the third electrode STG1 may be a part of a metal pattern. The third electrode STG1 of the reset transistor ST1 may overlap the channel portion STA1 of the reset transistor ST1.

In an embodiment of the disclosure, the reset transistor ST1 may be disposed in the same layer as the third transistor T3. That is, the first electrode STS1, the channel portion STA1, and the second electrode STD1 of the reset transistor ST1 may be formed through the same process as the first electrode S3, the channel portion A3, and the second electrode D3 of the third transistor T3. The third electrode STG1 of the reset transistor ST1 may be formed at the same time as the third electrode G3 of the third transistor T3 through the same process. Although not separately shown, the first and second electrodes of the amplification transistor ST2 and the output transistor ST3 of the sensor driving circuit O_SD may be formed through the same process as the first electrode S1 and the second electrode D1 of the first transistor T1. The reset transistor ST1 and the third transistor T3 may be formed in the same layer through the same process. Accordingly, an additional process of forming the reset transistor ST1 is not desired, thus improving process efficiency and reducing costs.

The element layer DP_ED may further include the photodetector OPD.

The photodetector OPD may include the anode AE1, a photoelectric conversion layer RL, and the cathode CE. The anode AE1 of the photodetector OPD may be disposed in the same layer as the anode AE of the light-emitting element ED. That is, the anode AE1 may be disposed on the circuit layer DP_CL and may be simultaneously formed through the same process as the anode AE of the light-emitting element ED.

The second film opening PDL-OP2 of the pixel defining layer PDL may expose at least a portion of the anode AE1. The photoelectric conversion layer RL may be disposed on the anode AE1 exposed by the second film opening PDL-OP2. The photoelectric conversion layer RL may include an organic photo-sensing material. The cathode CE may be disposed on the photoelectric conversion layer RL. Each of the anode AE1 and the cathode CE may receive an electrical signal. The anode AE1 and the cathode CE may receive different signals from each other. Accordingly, a predetermined electric field may be formed between the anode AE1 and the cathode CE. The photoelectric conversion layer RL generates an electrical signal corresponding to the light incident onto a sensor.

Charges generated in the photoelectric conversion layer RL may change the electric field between the anode AE1 and the cathode CE. The amount of charges generated by the photoelectric conversion layer RL may vary depending on whether a light is incident onto the photodetector OPD, the amount of light incident onto the photodetector OPD, or the intensity of light incident onto the photodetector OPD. Accordingly, the electric field formed between the anode AE1 and the cathode CE may vary. The photodetector OPD according to the disclosure may acquire information on a user's fingerprint or information on illuminance through a change in electric field between the anode AE1 and the cathode CE.

The encapsulation layer TFE is disposed on the element layer DP_ED. The encapsulation layer TFE includes at least one inorganic layer or at least one organic layer. In an embodiment of the disclosure, the encapsulation layer TFE may include two inorganic layers and an organic layer interposed therebetween. In an embodiment of the disclosure, a thin-film encapsulation layer may include a plurality of inorganic layers and a plurality of organic layers, which are alternately stacked.

An encapsulation inorganic layer may protect the light-emitting element ED and the photodetector OPD from moisture or oxygen, and an encapsulation organic layer may protect the light-emitting element ED and the photodetector OPD from foreign objects such as dust particles. The encapsulation inorganic layer may include a silicon nitride layer, a silicon oxynitride layer, a silicon oxide layer, a titanium oxide layer, an aluminum oxide layer, or the like, but is not limited particularly thereto. The encapsulation organic layer may include an acryl-based organic layer, and is not particularly limited.

Figure 5:
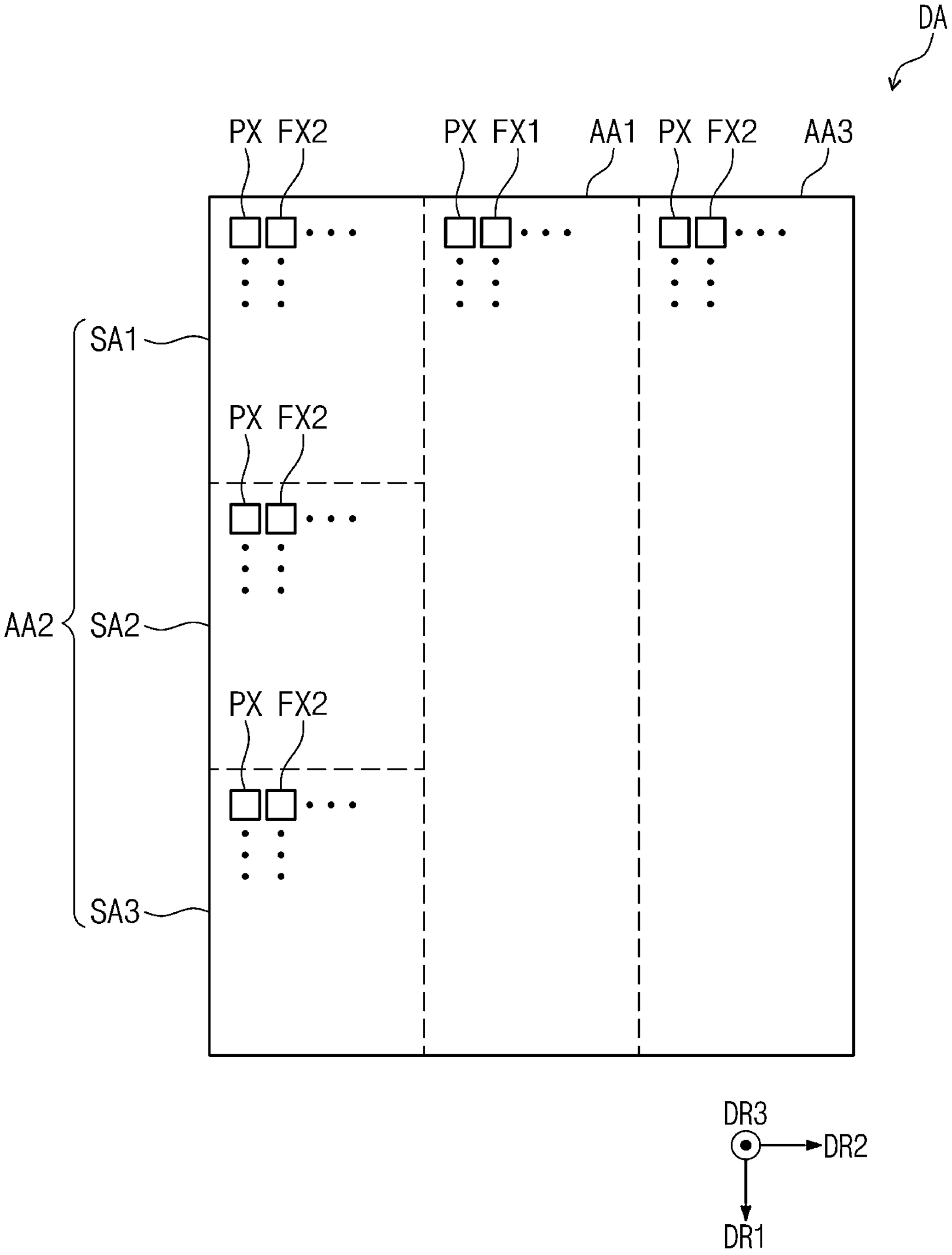
FIG. 5 illustrates a display area of an embodiment of a display panel according to the disclosure.

FIG. 5 shows an embodiment of the display area DA of the display panel DP (refer to FIG. 2) according to the disclosure.

Referring to FIG. 5, the display area DA may include a first area AA1, a second area AA2, and a third area AA3. The second area AA2 may be disposed adjacent to the first area AA1 in a direction opposite to the second direction DR2. The third area AA3 may be disposed adjacent to the first area AA1 in the second direction DR2. That is, the second area AA2, the first area AA1, and the third area AA3 may be sequentially arranged in the second direction DR2. The first area AA1 may be disposed between the second area AA2 and the third area AA3.

The second area AA2 may include a first sensing area SA1, a second sensing area SA2, and a third sensing area SA3 sequentially arranged in the first direction DR1. The second sensing area SA2 may be disposed adjacent to the first sensing area SA1 in the first direction DR1. The third sensing area SA3 may be disposed adjacent to the second sensing area SA2 in the first direction DR1.

Although it is illustrated in FIG. 5 that the second area AA2 includes the first sensing area SA1, the second sensing area SA2, and the third sensing area SA3, the third area AA3 where the second sensor FX2 is disposed in the display area DA in an embodiment of the disclosure may also include first to third sensing areas SA1, SA2, and SA3. That is, the second area AA2 and the third area AA3 may have a symmetrical shape with the first area AA1 interposed therebetween.

Referring to FIGS. 3, 4A, and 5, the first sensor FX1 may be disposed in the first area AA1. A reset transistor ST1 of the first sensor FX1 may be connected to the first reset control line RCL1. The first reset control signal GR may be provided to the first sensor FX1. That is, the first reset control line RCL1 may be connected to the sensors FX1 disposed in the first area AA1.

The second sensor FX2 may be disposed in the second area AA2. A reset transistor ST1 of the second sensor FX2 may be connected to the second reset control line RCL2. The second reset control signals GR_L1, GR_L2, and GR_L3 may be provided to the second sensor FX2. That is, the second reset control line RCL2 may be connected to the sensors FX2 disposed in the second area AA2. Also, the second reset control line RCL2 may be connected to the sensors FX2 disposed in the third area AA3.

The (2-1)-th reset control signal GR_L1 may be provided to the first sensing area SA1. The (2-2)-th reset control signal GR_L2 may be provided to the second sensing area SA2. The (2-3)-th reset control signal GR_L3 may be provided to the third sensing area SA3.

In an embodiment, the second reset control line RCL2 may include a (2-1)-th control line, a (2-2)-th control line, and a (2-3)-th control line, for example. The (2-1)-th control line may be connected to the second sensors FX2 disposed in the first sensing area SA1, the (2-2)-th control line may be connected to the second sensors FX2 disposed in the second sensing area SA2, and the (2-3)-th control line may be connected to the second sensors FX2 disposed in the third sensing area SA3. The (2-1)-th reset control signal GR_L1 may be provided to the (2-1)-th control line, the (2-2)-th reset control signal GR_L2 may be provided to the (2-2)-th control line, and the (2-3)-th reset control signal GR_L3 may be provided to the (2-3)-th control line.

It should be noted that this is an illustrative embodiment and the connection relationship of the second reset control line RCL2 in an embodiment of the disclosure is not limited thereto. In an embodiment, the second reset control line RCL2 may provide the (2-1)-th reset control signal GR_L1, the (2-2)-th reset control signal GR_L2, and the (2-3)-th reset control signal GR_L3 in a time-division manner, for example.

Although the second sensors FX2 disposed in the second area AA2 have been described with reference to FIG. 5, the third area AA3 may have a configuration symmetrical to that of the second area AA2 with the first area AA1 interposed therebetween, and may have the same configuration as the wiring connection relationship of the second area AA2.

The arrangement relationship of the first to third areas AA1, AA2, and AA3 in an embodiment of the disclosure may be changed according to location settings. In an embodiment, the third area AA3 may be omitted, and a plurality of first areas AA1 may be provided, for example. The second area AA2 may be disposed between the plurality of first areas AA1.

Figure 6A:
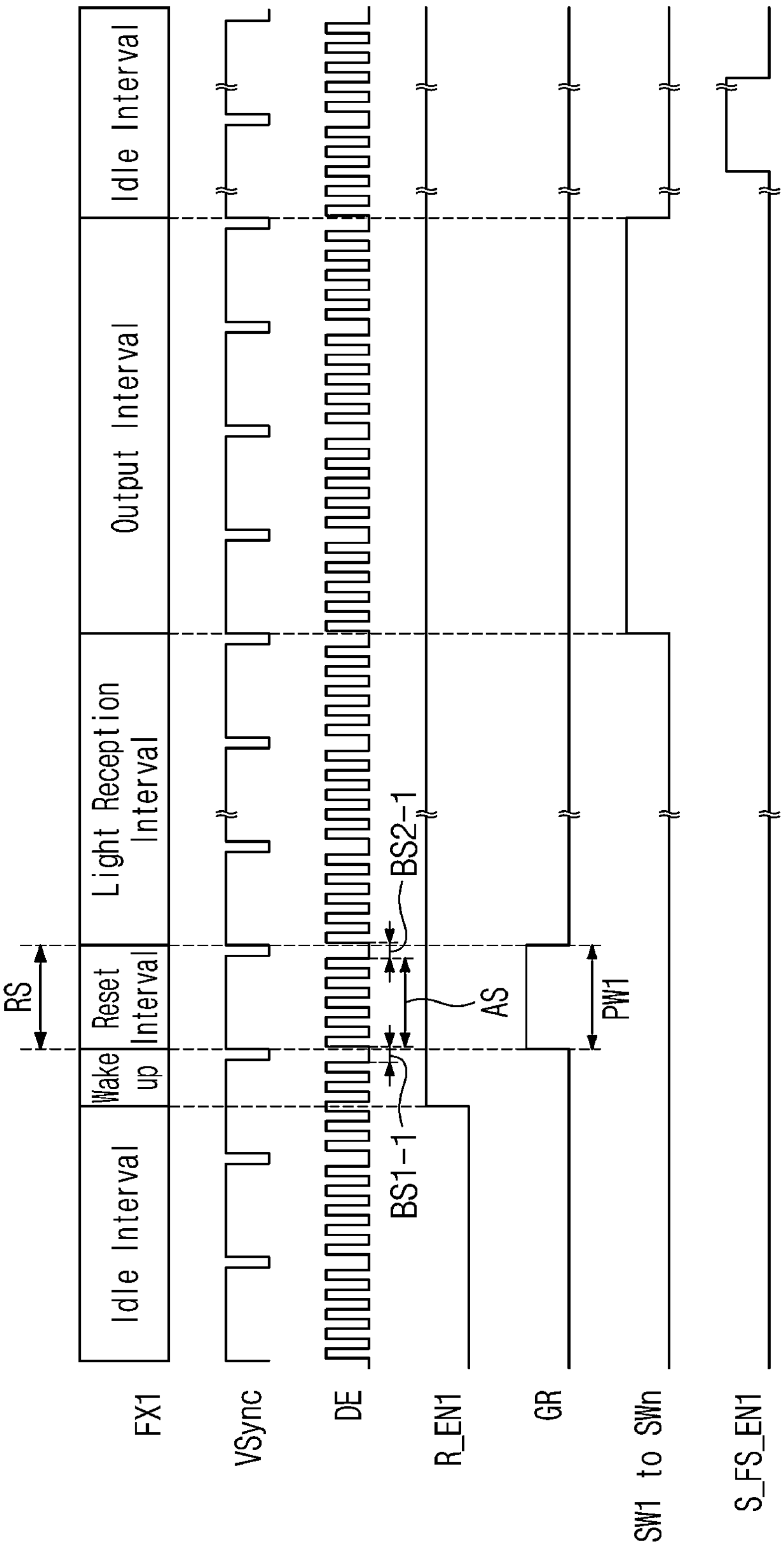
FIG. 6A is a waveform diagram for describing an embodiment of operation of a first sensor according to the disclosure.
Figure 6B:
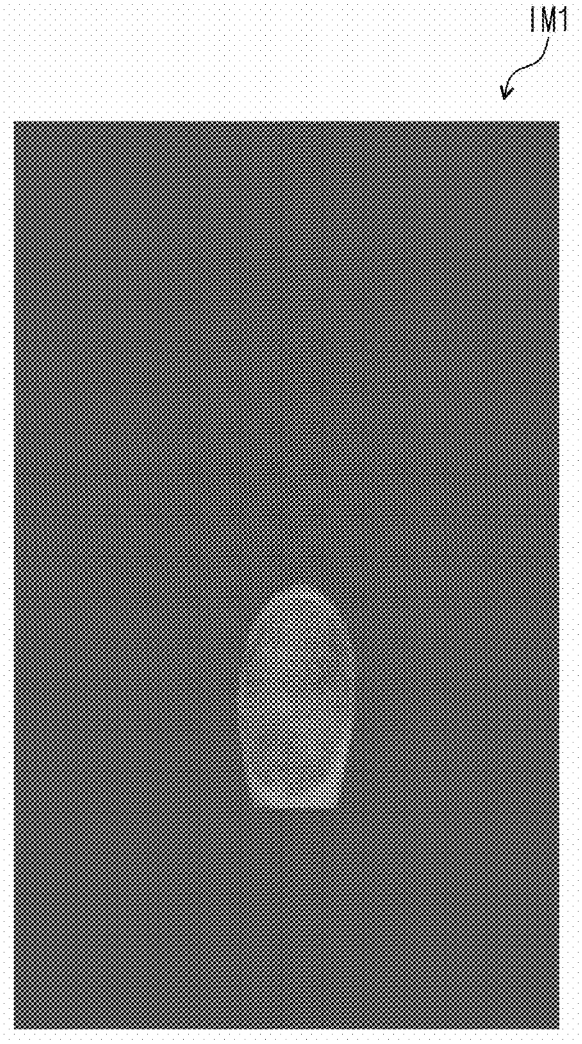
FIG. 6B is an image acquired by the first sensor.

FIG. 6A is a waveform diagram for describing an embodiment of operation of the first sensor FX1 according to the disclosure. FIG. 6B is an image acquired by the first sensor FX1. Specifically, FIG. 6A is for describing the operation of the first sensor FX1 for sensing a fingerprint, and FIG. 6B is a first image IM1 of the first area AA1 (refer to FIG. 5) acquired according to the operation of FIG. 6A. Fingerprint sensing may be performed only on an area where a touch occurs while the first sensor is operating.

Referring to FIGS. 3, 5, and 6A, when a user executes a predetermined application, the display device DD may display a screen for user authentication when the corresponding application is an application that desires user authentication information to be verified. The first sensor FX1 may sequentially enter a reset interval, a light reception interval (or a first light reception interval), and an output interval, which will be described in detail below.

When a user attempts an input, a first enable signal R_EN1 may rise. The first enable signal R_EN1 may be a signal provided from the driving controller 100 to the sensor controller 500, but is not particularly limited thereto.

When the first enable signal R_EN1 rises, the first reset control signal GR may rise. In an embodiment, the first reset control signal GR may be generated by a combination of the first enable signal R_EN1 and a vertical synchronization signal Vsync, for example. However, the disclosure is not limited thereto. The first reset control signal GR may be generated only by the first enable signal R_EN1 or may be generated by a combination of the first enable signal R_EN1 and another control signal (e.g., a data enable signal DE).

The data enable signal DE may operate in blank intervals BS1-1 and BS2-1 in which data signals are not provided to the plurality of data lines DL1 to DLm and an active interval AS in which data signals are provided to the plurality of data lines DL1 to DLm. The data enable signal DE may have one blank interval BS1-1 or BS2-1 and one active interval AS which are repeated at a predetermined cycle. In FIG. 6A, the blank intervals BS1-1 and BS2-1 are shown as the first blank interval BS1-1 and the second blank interval BS2-1 for convenience of description.

After the first enable signal R_EN1 is activated, the first reset control signal GR may be activated at a first rising time point of the vertical synchronization signal Vsync and deactivated at a second rising time point. That is, the first reset control signal GR may rise in the first blank interval BS1-1 after the first enable signal R_EN1 has risen, and fall in the second blank interval BS2-1.

In this case, an interval in which the first reset control signal GR has a relatively high level may be also referred to as a rising interval. Although it is described with reference to FIG. 6A that the rising interval of the first reset control signal GR corresponds to one cycle of the vertical synchronization signal Vsync, in an embodiment, the rising interval of the first reset control signal GR may correspond to two cycles of the vertical synchronization signal Vsync.

The first sensor FX1 may be maintained in the state of an idle interval before a user's input attempt occurs. As in one embodiment of the disclosure, when the rising time point of the first enable signal R_EN1 is not included in the first blank interval BS1-1, the first sensor FX1 may have a wake-up interval between the rising time point of the first enable signal R_EN1 and the first blank interval BS1-1. However, when the rising time point of the first enable signal R_EN1 is included in the first blank interval BS1-1, the wake-up interval may be omitted, and the first sensor FX1 may enter a reset interval RS immediately after an idle interval.

The reset interval RS may be defined as an interval in which the first reset control signal GR is provided. The first reset control signal GR may have a first pulse width PW1. During the reset interval RS, the first sensor FX1 may be reset by receiving the first reset control signal GR. The first reset control signal GR may be provided to the plurality of first sensors FX1 commonly to simultaneously reset the plurality of first sensors FX1. That is, the first reset control signal GR may simultaneously reset the plurality of first sensors FX1 disposed in the first area AA1.

When the reset interval RS ends in the second blank interval BS2-1, the first sensor FX1 may receive first light to collect information provided by the user for a predetermined interval (i.e., light reception interval). The first light may be light output from pixels PX disposed in an area overlapping the user's hand US_F (refer to FIG. 1) in the first area AA1.

In general, biometric information may be measured in a middle area of the display area DA. Accordingly, the first area AA1 where the first sensor FX1 for sensing the user's biometric information is disposed may be disposed in a central area of the display area DA. However, This is an illustrative embodiment, and the arrangement relationship of the first to third areas AA1, AA2, and AA3 in an embodiment of the disclosure is not limited thereto. In an embodiment, the third area AA3 may be omitted, and a plurality of first areas AA1 may be provided, for example. The second area AA2 may be disposed between the plurality of first areas AA1.

In an embodiment, the light reception interval is an interval for securing a signal difference between the ridges and valleys of the fingerprint based on light reflected from the ridges and valleys of the fingerprint among the first light, and the length of the light reception interval may be 100 milliseconds (ms), for example. However, the length of the light reception interval is not particularly limited thereto.

After a predetermined time has elapsed from the start of the light reception interval, the first sensor FX1 may output readout signals via the readout lines RL1 to RLh in response to the write scan signals SW1 to SWn (or referred to as output control signals) during the output interval. The length of the output interval may be 32 ms, but is not particularly limited thereto. The output interval may be a part of a light reception interval for receiving light.

During the output interval, the sensor controller 500 may receive readout signals corresponding to the first image IM1 corresponding to the first area AA1 from the first sensors FX1 disposed in the first area AA1.

When the output interval ends, the first sensor FX1 may be switched to the state of the idle interval. The sensor controller 500 may generate the detection signal S_FS by processing the received readout signals and provide the detection signal S_FS to the driving controller 100 in response to a first detection enable signal S_FS_EN1. When the actual input ends (e.g., when the user's touch or fingerprint recognition ends), a relevant application may end a collection interval and enter a processing interval for processing user information based on the detection signal S_FS.

The driving controller 100 may output the first image IM1 based on the detection signal S_FS. The driving controller 100 may perform an operation of performing comparison with the biometric information of the user based on the fingerprint image of the first image IM1.

Figure 7A:
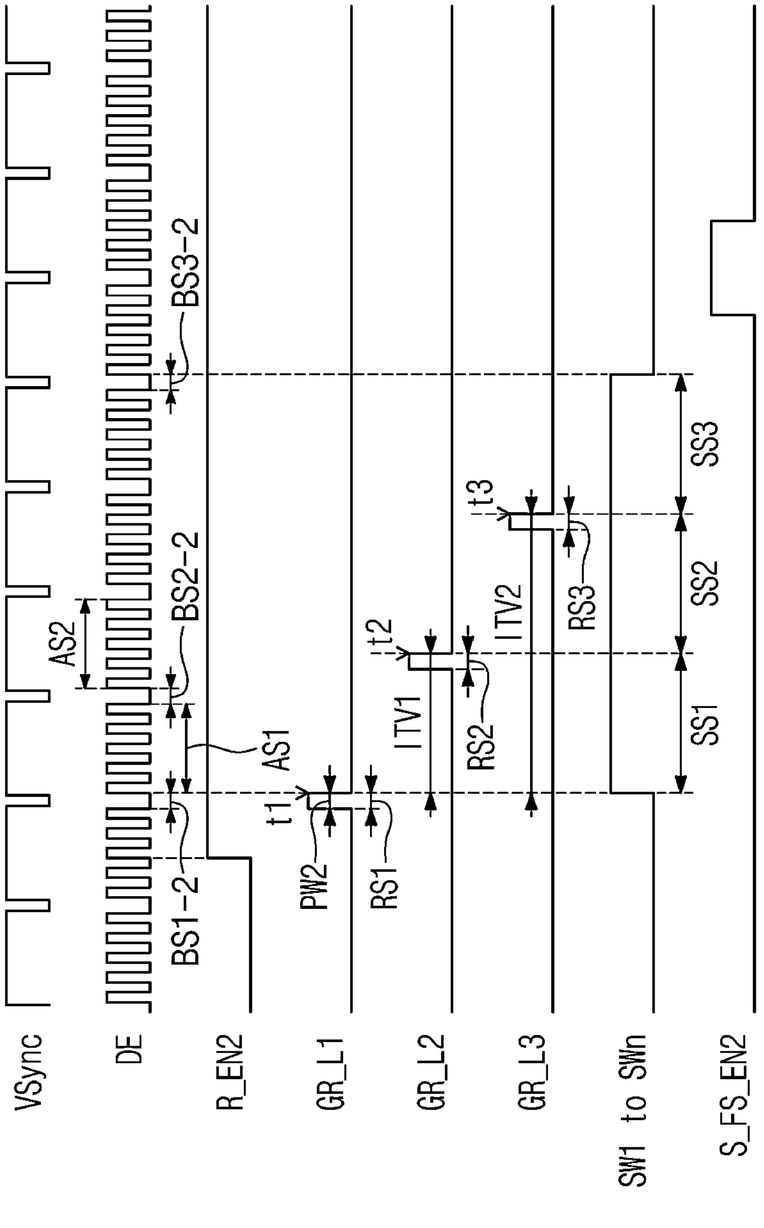
FIG. 7A is a waveform diagram for describing an embodiment of operation of a second sensor according to the disclosure.
Figure 7B:
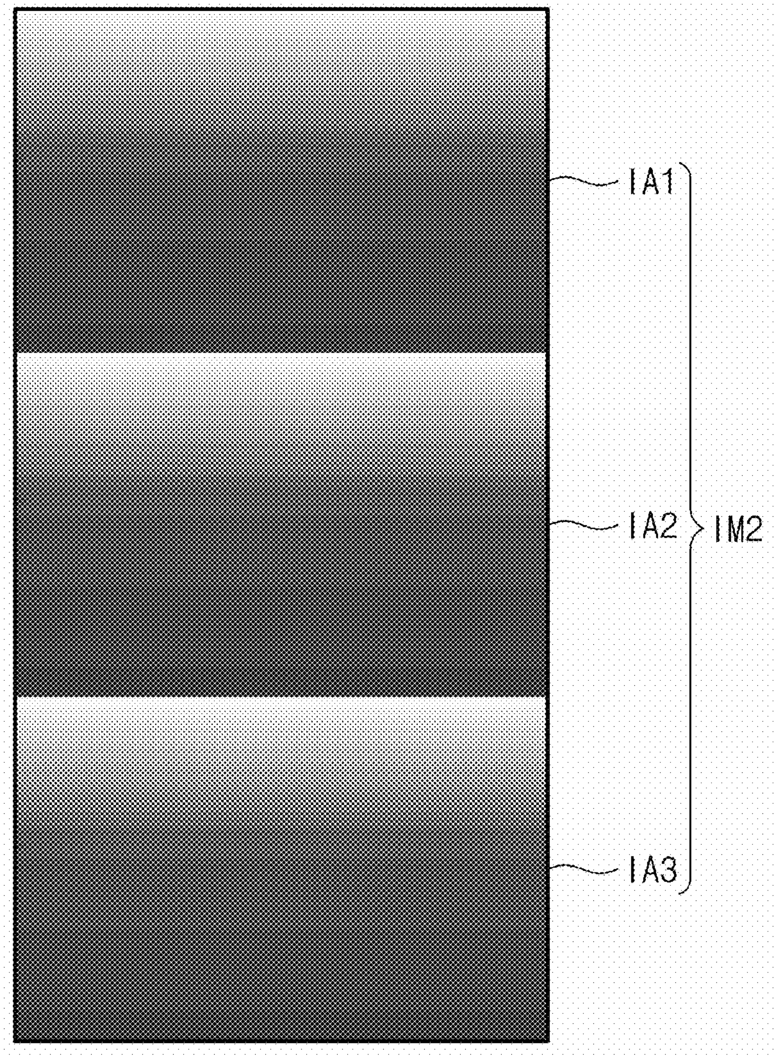
FIG. 7B is an image acquired by the second sensor.

FIG. 7A is a waveform diagram for describing an embodiment of operation of the second sensor FX2 according to the disclosure. FIG. 7B is an image acquired by the second sensor FX2. Specifically, FIG. 7A is for describing the operation of the second sensor FX2 that operates to sense an illuminance, and FIG. 7B is a second image IM2 of the second area AA2 (refer to FIG. 5) or the third area AA3 (refer to FIG. 5) acquired according to the operation of FIG. 7A. In the description of FIG. 7A, the components that are described with reference to FIG. 6A are marked by the same reference numerals, and thus, additional description will be omitted to avoid redundancy.

Referring to FIGS. 3, 4A, 5, 7A, and 7B, an illuminance may be sensed using the second sensor FX2. In an embodiment, the second sensor FX2 may operate to measure ambient brightness at a predetermined period, for example. A plurality of second sensors FX2 may be provided, and the plurality of second sensors FX2 may sequentially enter the reset intervals RS1, RS2, and RS3 and the output intervals SS1, SS2, and SS3. The reset intervals RS1, RS2, and RS3 may include the first reset interval RS1, the second reset interval RS2, and the third reset interval RS3. The output intervals SS1, SS2, and SS3 may include the first output interval SS1, the second output interval SS2, and the third output interval SS3. Details will be described below.

In the case of sensing a fingerprint, an illuminance difference between a ridge and a valley of the fingerprint may be sensed using a relatively low-illuminance area in which a sensing area is covered by a user's hand. In an embodiment, when sensing a fingerprint, a first illuminance range of less than 10 lux may be used, for example. The ambient brightness may have a second illuminance range wider than the first illuminance range. Therefore, it is desired to sense the second illuminance range wider than an illuminance range when sensing the fingerprint, to measure the illuminance. In an embodiment, the second illuminance range may be greater than or equal to 0 lux and less than or equal to 100,000 lux, for example.

When the ambient brightness is to be measured, a second enable signal R_EN2 may rise. The second enable signal R_EN2 may be a signal provided from the driving controller 100 to the sensor controller 500, but is not particularly limited thereto.

The data enable signal DE may operate in blank intervals BS1-2, BS2-2 and BS3-2 in which data signals are not provided to the plurality of data lines DL1 to DLm and active intervals AS1 and AS2 in which data signals are provided to the plurality of data lines DL1 to DLm. In FIG. 7A, for convenience of description, the blank intervals BS1-2, BS2-2, and BS3-2 are shown as the first blank interval BS1-2, the second blank interval BS2-2, and the third blank interval BS3-2, and the active intervals AS1 and AS2 are shown as the first active interval AS1 and the second active interval AS2.

When the second enable signal R_EN2 rises, the second reset control signals GR_L1, GR_L2, and GR_L3 may rise. The second reset control signals GR_L1, GR_L2, and GR_L3 may include the (2-1)-th reset control signal GR_L1, the (2-2)-th reset control signal GR_L2, and the (2-3)-th reset control signal GR_L3. The (2-1)-th reset control signal GR_L1, the (2-2)-th reset control signal GR_L2, and the (2-3)-th reset control signal GR_L3 may sequentially rise.

During the first reset interval RS1, the (2-1)-th reset control signal GR_L1 may be provided. The (2-1)-th reset control signal GR_L1 may have a second pulse width PW2. The second pulse width PW2 may be narrower than the first pulse width PW1 (refer to FIG. 6A) of the first reset control signal GR (refer to FIG. 6A). The (2-1)-th reset control signal GR_L1 may rise and fall in the first blank interval BS1-2 after the second enable signal R_EN2 has been activated. It should be noted that this is an illustrative embodiment and the rising time point of the (2-1)-th reset control signal GR_L1 in an embodiment of the disclosure is not limited thereto. In an embodiment, the falling time point t1 of the (2-1)-th reset control signal GR_L1 may exist in the first blank interval BS1-2, and the rising time point of the (2-1)-th reset control signal GR_L1 may be provided after the second enable signal R_EN2, for example.

That is, the first reset interval RS1 may overlap the first blank interval BS1-2. The falling time point t1 of the (2-1)-th reset control signal GR_L1 may be disposed between the first blank interval BS1-2 and the first active interval AS1. The (2-1)-th reset control signal GR_L1 may be provided to the second sensor FX2 disposed in the first sensing area SA1.

During the first reset interval RS1, the second sensor FX2 disposed in the first sensing area SA1 may be reset by receiving the (2-1)-th reset control signal GR_L1.

When the illuminance is sensed through ambient brightness, a part of the light reception interval (refer to FIG. 6A) in an embodiment of the disclosure may be omitted. Through this, it is possible to prevent a phenomenon in which the second sensor FX2 is saturated by receiving an excessive amount of light and thus cannot receive data desired for illuminance sensing. In an embodiment, in the operation of the second sensor FX2, the light reception interval may include only an interval overlapping the output interval, for example.

The second area AA2 and the third area AA3 where the second sensor FX2 for measuring ambient brightness is disposed may be disposed in a peripheral area of the display area DA. However, This is an illustrative embodiment, and the arrangement relationship of the first to third areas AA1, AA2, and AA3 in an embodiment of the disclosure is not limited thereto. In an embodiment, the third area AA3 may be omitted, and a plurality of first areas AA1 may be provided. The second area AA2 may be disposed between the plurality of first areas AA1, for example.

According to the disclosure, the display device DD may easily sense ambient brightness using the second sensor FX2 in another area even when the second sensor FX2 in a predetermined area is unable to sense ambient brightness due to, e.g., an object or the user's hand. In an embodiment, when the second area AA2 is covered, ambient brightness may be sensed using the second sensor FX2 disposed in the third area AA3, and illuminance may be sensed based on the ambient brightness, for example. Accordingly, the display device DD with improved reliability may be provided.

After the first reset interval RS1, the second sensor FX2 may output readout signals through the readout lines RL1 to RLh in response to the write scan signals SW1 to SWn during the output interval. The first reset interval RS1 may not overlap the output interval.

During the first output interval SS1, the sensor controller 500 may receive readout signals corresponding to a first image area IA1 corresponding to the first sensing area SA1 from the second sensors FX2 disposed in the first sensing area SA1. That is, during the first output interval SS1, the second sensor FX2 may output a signal corresponding to a first illuminance of the first sensing area SA1. In an embodiment, an image of the first image area IA1 may display the first illuminance, for example.

During the second reset interval RS2, the (2-2)-th reset control signal GR_L2 may be provided. The (2-2)-th reset control signal GR_L2 may rise and fall in the second active interval AS2 after the (2-1)-th reset control signal GR_L1 has been provided. That is, the second reset interval RS2 may overlap the second active interval AS2. The (2-2)-th reset control signal GR_L2 may be provided to the second sensor FX2 disposed in the second sensing area SA2.

A falling time point t2 at which the (2-2)-th reset control signal GR_L2 falls may be disposed between the first output interval SS1 and the second output interval SS2. The falling time point t1 of the (2-1)-th reset control signal GR_L1 provided to the first sensing area SA1 may be different from the falling time point t2 of the (2-2)-th reset control signal GR_L2 provided to the second sensing area SA2. In an embodiment, the falling time point t2 of the (2-2)-th reset control signal GR_L2 may be disposed between the falling time point t1 of the (2-1)-th reset control signal GR_L1 and the falling time point t3 of the (2-3)-th reset control signal GR_L3, which is to be describe below, for example.

The (2-2)-th reset control signal GR_L2 may be delayed by a first interval ITV1 from the (2-1)-th reset control signal GR_L1. The first interval ITV1 may be an interval from the falling time point t1 of the (2-1)-th reset control signal GR_L1 to the falling time point t2 of the (2-2)-th reset control signal GR_L2.

During the second reset interval RS2, the second sensor FX2 disposed in the second sensing area SA2 may be reset by receiving the (2-2)-th reset control signal GR_L2. The second reset interval RS2 may overlap the output interval.

During the second output interval SS2, the sensor controller 500 may receive readout signals corresponding to a second image area IA2 corresponding to the second sensing area SA2 from the second sensors FX2 disposed in the second sensing area SA2. That is, during the second output interval SS2, the second sensor FX2 may output a signal corresponding to a second illuminance of the second sensing area SA2. In an embodiment, the image of the second image area IA2 may display the second illuminance, for example.

During the third reset interval RS3, the (2-3)-th reset control signal GR_L3 may be provided. The (2-3)-th reset control signal GR_L3 may rise and fall while being spaced apart from the (2-2)-th reset control signal GR_L2 after the (2-2)-th reset control signal GR_L2 has been provided. The (2-3)-th reset control signal GR_L3 may be provided to the second sensor FX2 disposed in the third sensing area SA3.

A falling time point t3 at which the (2-3)-th reset control signal GR_L3 falls may be disposed between the second output interval SS2 and the third output interval SS3. The falling time point t2 of the (2-2)-th reset control signal GR_L2 provided to the second sensing area SA2 may be different from the falling time point t3 of the (2-3)-th reset control signal GR_L3 provided to the third sensing area SA3.

The (2-3)-th reset control signal GR_L3 may be delayed by a second interval ITV2 from the (2-1)-th reset control signal GR_L1. The second interval ITV2 may be an interval from the falling time point t1 of the (2-1)-th reset control signal GR_L1 to the falling time point t3 of the (2-3)-th reset control signal GR_L3. The second interval ITV2 may be longer than the first interval ITV1.

During the third reset interval RS3, the second sensor FX2 disposed in the third sensing area SA3 may be reset by receiving the (2-3)-th reset control signal GR_L3. The third reset interval RS3 may overlap the output interval.

During the third output interval SS3, the sensor controller 500 may receive readout signals corresponding to a third image area IA3 corresponding to the third sensing area SA3 from the second sensors FX2 disposed in the third sensing area SA3. That is, during the third output interval SS3, the second sensor FX2 may output a signal corresponding to a third illuminance of the third sensing area SA3. In an embodiment, the image of the third image area IA3 may display the third illuminance, for example.

The driving controller 100 may acquire the second image IM2 by combining readout signals corresponding to the first image area IA1, the second image area IA2, and the third image area IA3, respectively. The driving controller 100 may detect an external brightness based on at least one of the first illuminance of the first image area IA1, the second illuminance of the second image area IA2, and the third illuminance of the third image area IA3. That is, the display device DD may acquire the second image IM2 by sensing the illuminance according to a position of the display panel DP through the second sensor FX2. The display device DD may detect the illuminance based on the second image IM2.

Unlike the disclosure, when the same sensor FX is used for both fingerprint sensing and illuminance sensing, a gradation image may be acquired by a deviation in length of light reception intervals according to positions during illuminance sensing. In this case, when the external brightness is low, the external brightness is detected at the bottom of the image where the sensor FX, which receives sufficient light, is disposed and when the external brightness is high, the external brightness is detected at the top of the image where the sensor FX, which receives an excessive amount of light and is not saturated, is disposed, significant illuminance sensing data may be sensed only for a predetermined position in the display area DA according to the illuminance. That is, when the predetermined position is covered, reliability of illuminance sensing may be reduced. However, according to the disclosure, the illuminance according to external brightness may be sensed according to the position of a panel using the second sensor FX2. The second reset control signals GR_L1, GR_L2, and GR_L3 may be applied to the first sensing area SA1, the second sensing area SA2, and the third sensing area SA3, respectively. Through this, the display device DD may acquire the second image IM2. The display device DD may sense the illuminance using at least one of the first image area IA1, the second image area IA2, and the third image area IA3 of the second image IM2. In an embodiment, even when at least one of the first sensing area SA1, the second sensing area SA2, and the third sensing area SA3 is covered by an external object or the user's hand, the display device DD may sense the Illuminance corresponding to external brightness using another one of the first sensing area SA1, the second sensing area SA2, and the third sensing area SA3, for example. Accordingly, the display device DD with improved reliability may be provided.

Figure 8:
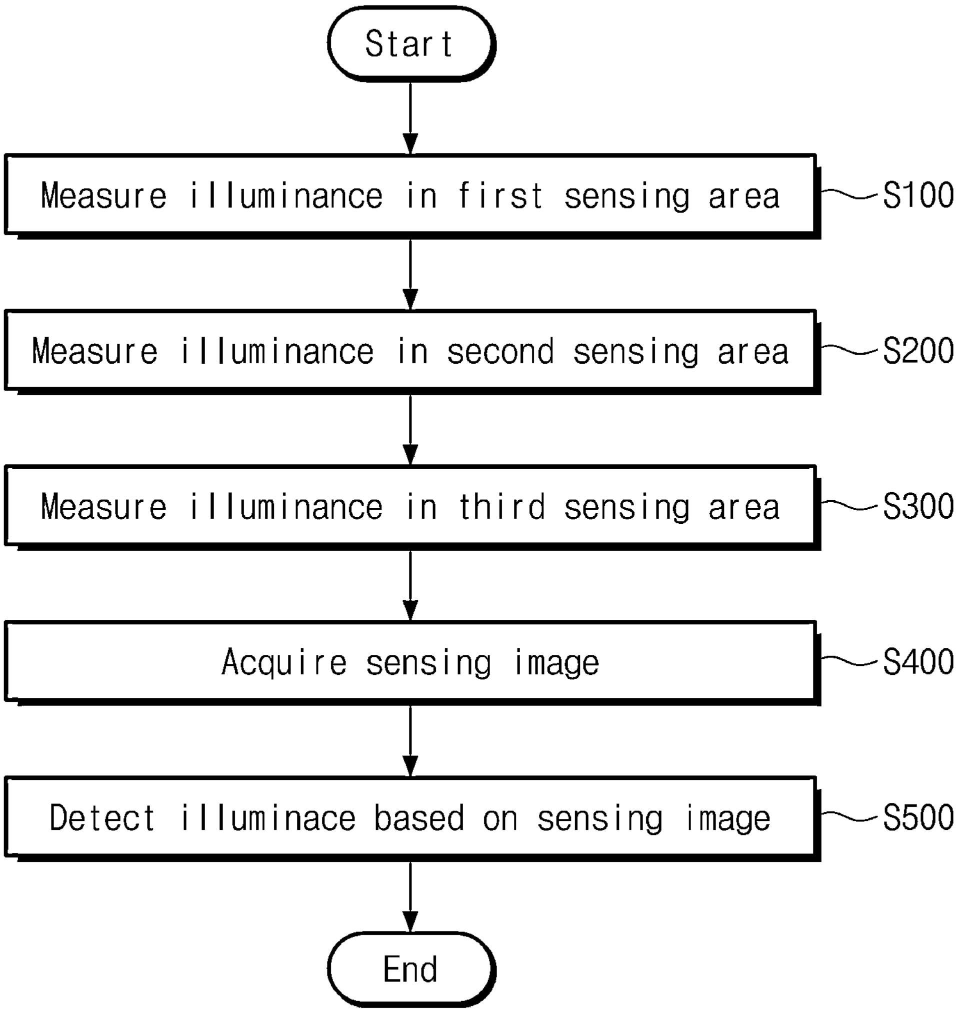
FIG. 8 is a flowchart illustrating an embodiment of a method of driving a display device, according to the disclosure.

FIG. 8 is a flowchart illustrating an embodiment of a method of driving the display device DD (refer to FIG. 1) according to the disclosure.

Referring to FIGS. 3, 5, 7A, 7B, and 8, the display device DD may measure the illuminance of the first sensing area SA1 using the second sensor FX2 disposed in the first sensing area SA1 (S100). The display device DD may measure the illuminance of the second sensing area SA2 using the second sensor FX2 disposed in the second sensing area SA2 (S200). The display device DD may measure the illuminance of the third sensing area SA3 using the second sensor FX2 disposed in the third sensing area SA3 (S300).

The driving controller 100 may acquire the second image IM2 by combining the illuminances measured in the first sensing area SA1, the second sensing area SA2, and the third sensing area SA3 (S400). The second image IM2 may be also referred to as the sensing image IM2. The second image IM2 may include the first image area IA1 measured in the first sensing area SA1, the second image area IA2 measured in the second sensing area SA2, and the third image area IA3 measured in the third sensing area SA3.

The driving controller 100 may detect the illuminance based on the acquired sensing image IM2 (S500).

According to the disclosure, the second reset control signals GR_L1, GR_L2, and GR_L3 may be applied to the first sensing area SA1, the second sensing area SA2, and the third sensing area SA3, respectively. Through this, the display device DD may acquire the second image IM2. The display device DD may sense the illuminance using at least one of the first image area IA1, the second image area IA2, and the third image area IA3 of the second image IM2. In an embodiment, even when at least one of the first sensing area SA1, the second sensing area SA2, and the third sensing area SA3 is covered by an external object or the user's hand, the display device DD may sense the illuminance corresponding to external brightness using another one of the first sensing area SA1, the second sensing area SA2, and the third sensing area SA3, for example. That is, the display device DD may detect an appropriate illuminance based on the sensing image IM2 acquired through measurement. Therefore, regardless of the external environment, the illuminance may be sensed for each panel position, thus improving the efficiency of the illuminance measurement. Accordingly, the display device DD with improved reliability may be provided.

According to the above embodiments, the display device may easily sense ambient brightness using the second sensor in another area even when the second sensor in a predetermined area is unable to sense ambient brightness due to, e.g., an object or the user's hand. In an embodiment, when the first area is covered, ambient brightness may be sensed using the second sensor disposed in the second area, and an illuminance may be sensed based on the ambient brightness. Accordingly, it is possible to provide a display device with improved reliability.

Although described above with reference to a preferred embodiment of the disclosure, it will be understood by those skilled in the art that various modifications and changes may be made in the disclosure without departing from the spirit and scope of the disclosure as set forth in the claims below. Accordingly, the technical scope of the inventive concept is not limited to the detailed description of this specification, but should be defined by the claims.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A display device comprising:
- a pixel including a pixel driving circuit and a light-emitting element;
- a sensor including:
  - a sensor driving circuit including:
    - a reset transistor including a gate electrode which receives a reset control signal including:
      - a first reset control signal; and
      - a second reset control signal different from the first reset control signal; and
  - a sensing element electrically connected to the sensor driving circuit; and
- a display panel in which a display area is defined, the display area including:
  - a first area; and
  - a second area adjacent to the first area in a same row,
- wherein the first reset control signal is provided to the reset transistor disposed in the first area, and the second reset control signal is provided to the reset transistor disposed in the second area.

2. The display device of claim 1, wherein the sensor is provided in plural, and
- wherein a plurality of sensors includes a first sensor disposed in the first area and a second sensor disposed in the second area.

3. The display device of claim 2, wherein the first sensor senses a fingerprint and the second sensor senses an illuminance.

4. The display device of claim 2, wherein the second area includes a first sensing area and a second sensing area spaced apart from the first sensing area in a predetermined direction, and
- wherein a falling time point of the second reset control signal provided to the first sensing area is different from a falling time point of the second reset control signal provided to the second sensing area.

5. The display device of claim 4, wherein the second reset control signal provided to the second sensing area is delayed by a first interval from the second reset control signal provided to the first sensing area.

6. The display device of claim 5, wherein the second area further includes a third sensing area spaced apart from the first sensing area in the predetermined direction with the second sensing area interposed therebetween,
- wherein the second reset control signal provided to the third sensing area is delayed by a second interval from the second reset control signal provided to the first sensing area, and
- wherein the second interval is longer than the first interval.

7. The display device of claim 4, wherein the reset transistor further includes a first electrode which receives a reset voltage and a second electrode connected to a first sensing node,
- wherein the sensor driving circuit of the second sensor further includes
- an amplification transistor including a first electrode which receives a sensing driving voltage, a second electrode connected to a second sensing node, and a gate electrode connected to the first sensing node, and
- an output transistor including a first electrode connected to the second sensing node, a second electrode connected to a readout line, and a gate electrode which receives an output control signal.

8. The display device of claim 7, wherein the output control signal is provided during an output interval,
- wherein a first reset interval in which the second reset control signal provided to the first sensing area is provided does not overlaps the output interval, and
- wherein a second reset interval in which the second reset control signal provided to the second sensing area is provided overlaps the output interval.

9. The display device of claim 8, wherein the output interval includes a first output interval and a second output interval which are consecutive, and wherein the second sensor outputs a signal corresponding to a first illuminance of the first sensing area during the first output interval, and the second sensor outputs a signal corresponding to a second illuminance of the second sensing area during the second output interval.

10. The display device of claim 9, further comprising:

a driving circuit which drives the display panel, wherein the driving circuit detects an external brightness based on one of the first illuminance and the second illuminance.

11. The display device of claim 10, wherein the display panel further includes a plurality of data lines electrically connected to the pixel, wherein the driving circuit includes a data driver which outputs a data signal to the plurality of data lines, and wherein the data driver operates in a blank interval in which the data signal is not output to the plurality of data lines and an active interval in which the data signal is output to the plurality of data lines.

12. The display device of claim 11, wherein the first reset interval overlaps the blank interval, and wherein the second reset interval overlaps the active interval.

13. The display device of claim 1, wherein a pulse width of the second reset control signal is narrower than a pulse width of the first reset control signal.

14. An electronic device comprising:

a pixel including a pixel driving circuit and a light-emitting element;

a sensor including:

a sensor driving circuit including:

a reset transistor including a gate electrode which receives a reset control signal; and a sensing element electrically connected to the sensor driving circuit; and a display panel in which a display area is defined, the display area including:

a first area; and a second area adjacent to the first area in a same row, the second area including:

a first sensing area; and a second sensing area spaced apart from the first sensing area in a predetermined direction, wherein a falling time point of the reset control signal provided to the first sensing area is different from a falling time point of the reset control signal provided to the second sensing area, wherein the reset control signal includes a first reset control signal and a second reset control signal different from the first reset control signal, and the first reset control signal is provided to the reset transistor disposed in the first area, and the second reset control signal is provided to the reset transistor disposed in the second area.

15. The electronic device of claim 14, wherein the sensor is provided in plural, and wherein a plurality of sensors includes a first sensor disposed in the first area and a second sensor disposed in the second area.

16. The electronic device of claim 15, wherein the first sensor senses a fingerprint and the second sensor senses an illuminance.

17. The electronic device of claim 14, wherein the reset control signal provided to the second sensing area is delayed by a first interval from the reset control signal provided to the first sensing area.

18. The electronic display of claim 14, wherein the reset transistor further includes a first electrode which receives a reset voltage and a second electrode connected to a first sensing node, wherein the sensor driving circuit includes:

an amplification transistor including a first electrode which receives a sensing driving voltage, a second electrode connected to a second sensing node, and a gate electrode connected to the first sensing node, and an output transistor including a first electrode connected to the second sensing node, a second electrode connected to a readout line, and a gate electrode which receives an output control signal.

19. The electronic device of claim 18, wherein the output control signal is provided during an output interval, wherein the reset control signal provided to the first sensing area does not overlap the output interval, and wherein the reset control signal provided to the second sensing area overlaps the output interval.

20. A display device comprising:

a pixel including a pixel driving circuit and a light-emitting element;

a sensor including:

a sensor driving circuit including:

a reset transistor including a gate electrode which receives a reset control signal; and a sensing element electrically connected to the sensor driving circuit; and a display panel in which a display area is defined, the display area including:

a first area; and a second area adjacent to the first area, the second area including:

a first sensing area; and a second sensing area spaced apart from the first sensing area in a predetermined direction, wherein a falling time point of the reset control signal provided to the first sensing area is different from a falling time point of the reset control signal provided to the second sensing area, the reset control signal provided to the second sensing area is delayed by a first interval from the reset control signal provided to the first sensing area, the second area further includes a third sensing area spaced apart from the first sensing area in the predetermined direction with the second sensing area interposed therebetween, wherein the reset control signal provided to the third sensing area is delayed by a second interval from the reset control signal provided to the first sensing area, and wherein the second interval is longer than the first interval.

* * * * *